United States Patent
Wang et al.

(10) Patent No.: US 10,452,195 B2
(45) Date of Patent: Oct. 22, 2019

(54) ELECTRONIC SYSTEM WITH GESTURE CALIBRATION MECHANISM AND METHOD OF OPERATION THEREOF

(71) Applicant: Samsung Electronics Co., Ltd., Suwon-si, Gyeonggi-Do (KR)

(72) Inventors: Rongrong Wang, San Jose, CA (US); Anton Treskunov, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 550 days.

(21) Appl. No.: 14/586,142

(22) Filed: Dec. 30, 2014

(65) Prior Publication Data

US 2016/0188109 A1 Jun. 30, 2016

(51) Int. Cl.
 G06F 3/041 (2006.01)
 G06F 3/01 (2006.01)
 G06F 3/03 (2006.01)
 G06F 3/0346 (2013.01)

(52) U.S. Cl.
 CPC .......... G06F 3/0418 (2013.01); G06F 3/011 (2013.01); G06F 3/017 (2013.01); G06F 3/0304 (2013.01); G06F 3/0346 (2013.01)

(58) Field of Classification Search
 CPC ...... G06F 3/0418; G06F 3/0346; G06F 3/011; G06F 3/0304; G06F 3/017; G06F 3/0425; G06F 3/013; G06F 3/03545; G06F 2203/04102; G06F 1/1652; H04N 13/0484
 See application file for complete search history.

(56) References Cited

U.S. PATENT DOCUMENTS

| | | | |
|---|---|---|---|
| 6,434,255 B1 | 8/2002 | Harakawa | |
| 6,930,593 B2 | 8/2005 | Crawshaw | |
| 7,129,927 B2 | 10/2006 | Mattsson | |
| 7,274,803 B1 * | 9/2007 | Sharma | G06K 9/00375 348/14.15 |
| 8,180,114 B2 | 5/2012 | Nishihara et al. | |
| 8,452,057 B2 | 5/2013 | Chen et al. | |

(Continued)

FOREIGN PATENT DOCUMENTS

| KR | 20080082683 A | 9/2008 |
|---|---|---|
| KR | 20130042010 A | 4/2013 |

(Continued)

OTHER PUBLICATIONS

Carbini, et al., "Pointing Gesture Visual Recognition for Large Display", 2014, France Telecom R&&D.

(Continued)

*Primary Examiner* — Justin R. Blaufeld
*Assistant Examiner* — Mong-Shune Chung

(57) ABSTRACT

An electronic system includes a display interface configured to display a calibration point; a sensor, coupled to the display interface, and configured to capture a first gesture directed at the calibration point from a first position; capture a second gesture directed at the calibration point from a second position, wherein the second position is different from the first position; and a control unit, coupled to the display interface, and configured to display a position indicator on the display interface based on a directive gesture captured by the sensor, the first gesture, and the second gesture.

18 Claims, 17 Drawing Sheets

(56) References Cited

U.S. PATENT DOCUMENTS

| | | |
|---|---|---|
| 8,457,353 B2 | 6/2013 | Reville et al. |
| 8,615,108 B1 | 12/2013 | Stoppa et al. |
| 8,749,530 B2 | 6/2014 | Wang |
| 9,063,578 B2 | 6/2015 | Bailey et al. |
| 9,430,096 B2 | 8/2016 | Murase et al. |
| 9,513,710 B2 | 12/2016 | Lee et al. |
| 2004/0164851 A1 | 8/2004 | Crawshaw |
| 2006/0209021 A1 | 9/2006 | Yoo et al. |
| 2007/0109274 A1 | 5/2007 | Reynolds |
| 2008/0018599 A1 | 1/2008 | Chang |
| 2009/0153479 A1 | 6/2009 | Gu et al. |
| 2009/0278915 A1 | 11/2009 | Kramer et al. |
| 2010/0050133 A1 | 2/2010 | Nishihara et al. |
| 2010/0088637 A1 | 4/2010 | Liu |
| 2011/0090147 A1 | 4/2011 | Gervais et al. |
| 2011/0148798 A1 | 6/2011 | Dahl |
| 2011/0239153 A1 | 9/2011 | Carter et al. |
| 2012/0062558 A1 | 3/2012 | Lee et al. |
| 2012/0229428 A1* | 9/2012 | Tavakoli ............. G06F 3/03545 345/179 |
| 2013/0120319 A1 | 5/2013 | Givon |
| 2013/0155052 A1* | 6/2013 | Ko ..................... H04N 13/0022 345/419 |
| 2013/0249864 A1* | 9/2013 | Wu ....................... G06F 3/0418 345/175 |
| 2013/0278501 A1* | 10/2013 | Bulzacki ................ G06F 3/017 345/157 |
| 2013/0326364 A1 | 12/2013 | Latta et al. |
| 2014/0028567 A1* | 1/2014 | Park ....................... G06F 3/005 345/168 |
| 2014/0043230 A1 | 2/2014 | Galor et al. |
| 2014/0139420 A1 | 5/2014 | Wu et al. |
| 2014/0191927 A1 | 7/2014 | Cho |
| 2014/0201666 A1 | 7/2014 | Bedikian et al. |
| 2014/0201689 A1 | 7/2014 | Redikian et al. |
| 2014/0292647 A1 | 10/2014 | Murase et al. |
| 2015/0035750 A1 | 2/2015 | Bailey et al. |
| 2015/0062010 A1 | 3/2015 | Lin et al. |
| 2016/0179205 A1* | 6/2016 | Katz ...................... G06F 3/013 345/156 |
| 2017/0262967 A1* | 9/2017 | Russell ................. G06T 5/006 |

FOREIGN PATENT DOCUMENTS

| | | |
|---|---|---|
| KR | 20140033025 A | 3/2014 |
| KR | 20140068855 A | 6/2014 |

OTHER PUBLICATIONS

Couturier, et al., "Pointing Fingers: Using Multiple Direct Interactions with Visual Objects to Perform Music", 2003, LMA-CNRS.

Ryan, "Finger and gesture recognition with Microsoft Kinect", 2012, Department of Electrical and Computer Engineering University of Stavanger.

Jing, et al., "Human-computer Interaction using Pointing Gesture based on an Adaptive Virtual Touch Screen", 2013, International Journal of Signal Processing, Image Processing and Pattern Recognition.

Wobbrock, et al., "User-Defined Gestures for Surface Computing", 2009, University of Washington.

Kato H. et al. "Marker Tracking and HMD Calibration for a Video-based Augmented Reality Conferencing System," Augmented Reality, 1999. (IWAR '99). Proceedings. 2nd IEEE and ACM International Workshop in San Francisco, California, Oct. 20-21, 1999, pp. 85-94, XP010358756, DOI: 10.1109/IWAR.1999.803809, ISBN 978-0-7695-0359-2, Publisher: IEEE.

China National Intellectual Property Administration, "The Second Office Action," Application No. CN201511024543.8, dated Dec. 13, 2018, 12 pages.

* cited by examiner

ELECTRONIC SYSTEM WITH GESTURE CALIBRATION MECHANISM AND METHOD OF OPERATION THEREOF

TECHNICAL FIELD

An embodiment of the present invention relates generally to an electronic system, and more particularly to a system with a gesture calibration mechanism.

BACKGROUND

Modern consumer and industrial electronics, especially display devices such as networked-enabled displays, touch-screen displays, curved displays, and tablet devices are providing increasing levels of functionality to support modern life including facilitating interactions with other electronic devices, appliances, and users. Research and development in the existing technologies can take a myriad of different directions.

As users become more empowered with the growth of display devices, new and old paradigms begin to take advantage of this new device space. There are many technological solutions to take advantage of this new device capability to communicate with users and other devices. However, user interactions with such display devices are often imprecise or inaccurate.

Thus, a need still remains for an electronic system with a gesture calibration mechanism appropriate for interactions between today's users and devices. In view of the ever-increasing commercial competitive pressures, along with growing client expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides an electronic system including a display interface configured to display a calibration point; a sensor, coupled to the display interface, and configured to capture a first gesture directed at the calibration point from a first position; capture a second gesture directed at the calibration point from a second position, wherein the second position is different from the first position; and a control unit, coupled to the display interface, and configured to display a position indicator on the display interface based on a directive gesture captured by the sensor, the first gesture, and the second gesture.

An embodiment of the present invention provides a method of operation of an electronic system including displaying, with a display interface, a calibration point; capturing, with a sensor coupled to the display interface, a first gesture directed at the calibration point from a first position; capturing a second gesture directed at the calibration point from a second position, wherein the second position is different from the first position; and displaying, with a control unit coupled to the display interface, a position indicator on the display interface based on a directive gesture captured by the sensor, the first gesture, and the second gesture.

An embodiment of the present invention provides a non-transitory computer readable medium including displaying a calibration point; capturing a first gesture directed at the calibration point from a first position; capturing a second gesture directed at the calibration point from a second position, wherein the second position is different from the first position; and displaying a position indicator on a display interface based on a directive gesture captured by a sensor, the first gesture, and the second gesture.

An embodiment of the present invention provides a sensor configured to capture a contact point between a calibration gesture and a display interface; and a control unit, coupled to the sensor, and configured to display a position indicator on the display interface based on a directive gesture captured by the sensor and the contact point.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
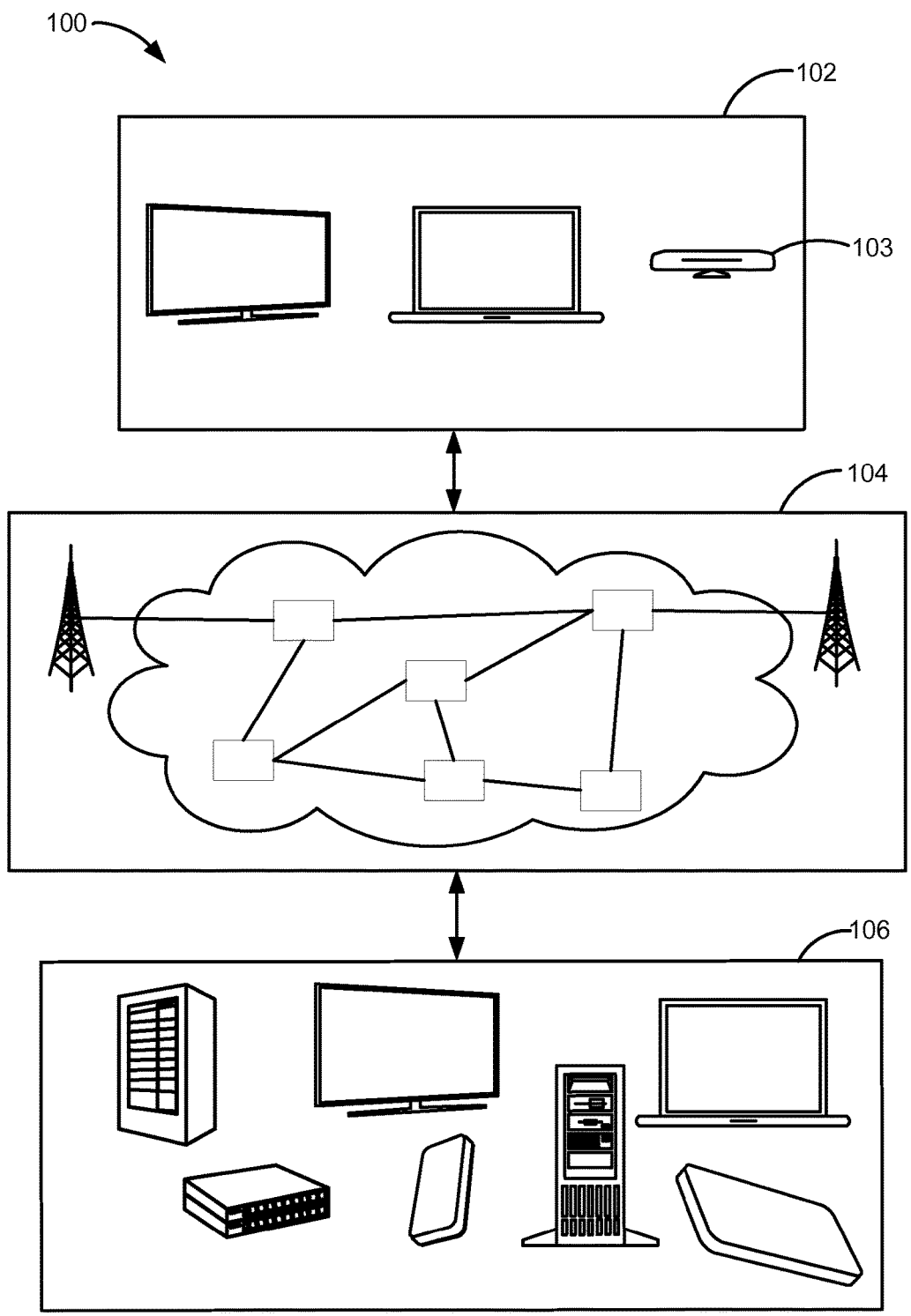
FIG. 1 is an electronic system with a gesture calibration mechanism in an embodiment of the present invention.

Embodiments of the present invention provide a more accurate method and system for controlling a display interface with an appendage of a user from a distance. As an example, the user can employ a hand gesture, such as a pointing gesture, to change channels on a television, select a link on a computing interface, or undertake a motion in a first-player video game. As a more specific example, embodiments of the present inventor can display a position indicator on the display interface based on a directive gesture, a first gesture directed at a calibration point, and a second gesture directed at the calibration point. As an even more specific example, embodiments of the present invention can generate the position indicator based on an intersection of a ray casting vector and a display plane of the display interface.

Embodiments of the present invention can also improve the accuracy of a gesture control system by aligning a display coordinate system with a physical coordinate system of the user as represented by a sensor coordinate system. As an example, embodiments of the present invention can generate a transformation matrix based on the calibration point in the display coordinate system and the intersection in the sensor coordinate system. As a more specific example, embodiments of the present invention can transform the coordinates of physical features on the directive gesture of the user into their corresponding coordinates in the display coordinate system. Embodiments of the present invention can then use the coordinates of the directive gesture in the display coordinate system to generate the position indicator.

Embodiments of the present invention can also be combined with a relative pointing procedure to improve the accuracy of dynamic gestures used to control a display interface. As an example, the user can calibrate an entertainment system, a gaming system, a computing system, or a combination thereof with one or more instances of a calibration gesture from different locations within a room or physical area and use the position indicator displayed on the display interface as a more accurate starting point for the dynamic gestures captured by one or more sensors using the relative pointing procedure. In this example, the relative pointing procedure can be used to capture the trajectory of a gesture of the user once the starting point of the gesture has been determined using the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with a gesture calibration mechanism in an embodiment of the present invention. The electronic system 100 includes a first device 102, such as a sensor 103, connected to a second device 106, such as a display device or an electronic device with a display interface. The first device 102 can communicate with the second device 106 with a communication path 104, such as a wireless or wired network.

For illustrative purposes, the electronic system 100 is described with the first device 102 as the sensor 103 and the second device 106 as a display device, although it is understood that the first device 102 can be different types of devices. For example, the first device 102 can be any of a variety of devices, such as a gaming console, an entertainment device, a display device, a laptop computer, a desktop computer, a tablet device, a mobile device, or other multi-functional devices. The first device 102 can couple to the communication path 104 to communicate with the second device 106.

The sensor 103 can be a component of the first device 102 or be a separate or discrete device. The sensor 103 can capture images, video, or visual spectra and can determine spatial locations or distances. As an example, the sensor 103 can capture static images, video frames, visual spectra, light reflectance, infrared (IR) signatures, ultraviolet (UV) signatures, or a combination thereof. As another example, the sensor 103 can include a depth sensor, a motion sensor, a red-green-blue (RGB) sensor, an active pixel sensor, a charge-coupled sensor, a complementary metal-oxide-semiconductor (CMOS) sensor, or a combination thereof.

As an example, the sensor 103 can be mounted on a television representing the first device 102. As another example, the sensor 103 can be embedded in a gaming console or a computing device representing the first device 102. As yet another example, the sensor 103 can be a standalone device hung on a wall or placed on a table overlooking the first device 102.

The second device 106 can be any variety of devices for displaying data, information, graphics, or a combination thereof. For example, the second device 106 can be a television, a projector device, or a monitor. Also, for example, the second device 106 can display an image captured by the sensor 103.

The second device 106 can also be a mobile device or a non-mobile device. For example, the second device 106 can be any of a variety of mobile devices, such as a smartphone, a tablet device, a cellular phone, a wearable device, a notebook computer, a netbook computer, a thin client device, a multi-functional mobile communication or entertainment device, or a combination thereof.

The second device 106 can also be a non-mobile device such as any of a variety of centralized or decentralized computing devices. For example, the second device 106 can be a desktop computer, a grid computing resource, a server, a server farm, a virtualized computing resource, a cloud computing resource, a router, a switch, a peer-to-peer distributed computing resource, or a combination thereof.

The second device 106 can be centralized in a single computer room, distributed across different rooms, distributed across different geographical locations, or embedded within a telecommunications network. For example, the second device 106 can be a particularized machine, such as a mainframe, a server, a cluster server, a rack mounted server, or a blade server, or as more specific examples, an IBM System z10™ Business Class mainframe or a HP ProLiant ML™ server. The second device 106 can have couple with the communication path 104 to communicate with the first device 102.

For illustrative purposes, the electronic system 100 is described with the first device 102 as the sensor 103 and the second device 106 as a display device, although it is understood that the first device 102 can also be the display device and the second device 106 can be the sensor 103. It is also understood that the first device 102 can be a computing device with the sensor 103 embedded in the computing device and the second device 106 can be a server coupled to the computing device through the communication path 104.

Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

As a more specific example, the first device 102 can be the sensor 103 mounted on a network-enabled television representing the second device 106. In this example, the first device 102 can connect directly to the second device 106 through the communication path 104. As an additional example, the first device 102 can be the network-enabled television with the sensor 103 embedded in the network-enabled television and the second device 106 can be a computing device such as a laptop, a desktop, or a server connected to the first device 102 through the communication path 104.

The communication path 104 can be a variety of networks or communication mediums. For example, the communication path 104 can include wireless communication, wired communication, optical communication, or a combination thereof. Satellite communication, cellular communication, Bluetooth™, Bluetooth™ Low Energy (BLE), wireless High-Definition Multimedia Interface (HDMI), ZigBee™, Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include a direct connection, personal area network (PAN), local area network (LAN), metropolitan area network (MAN), wide area network (WAN) or any combination thereof.

Figure 2:
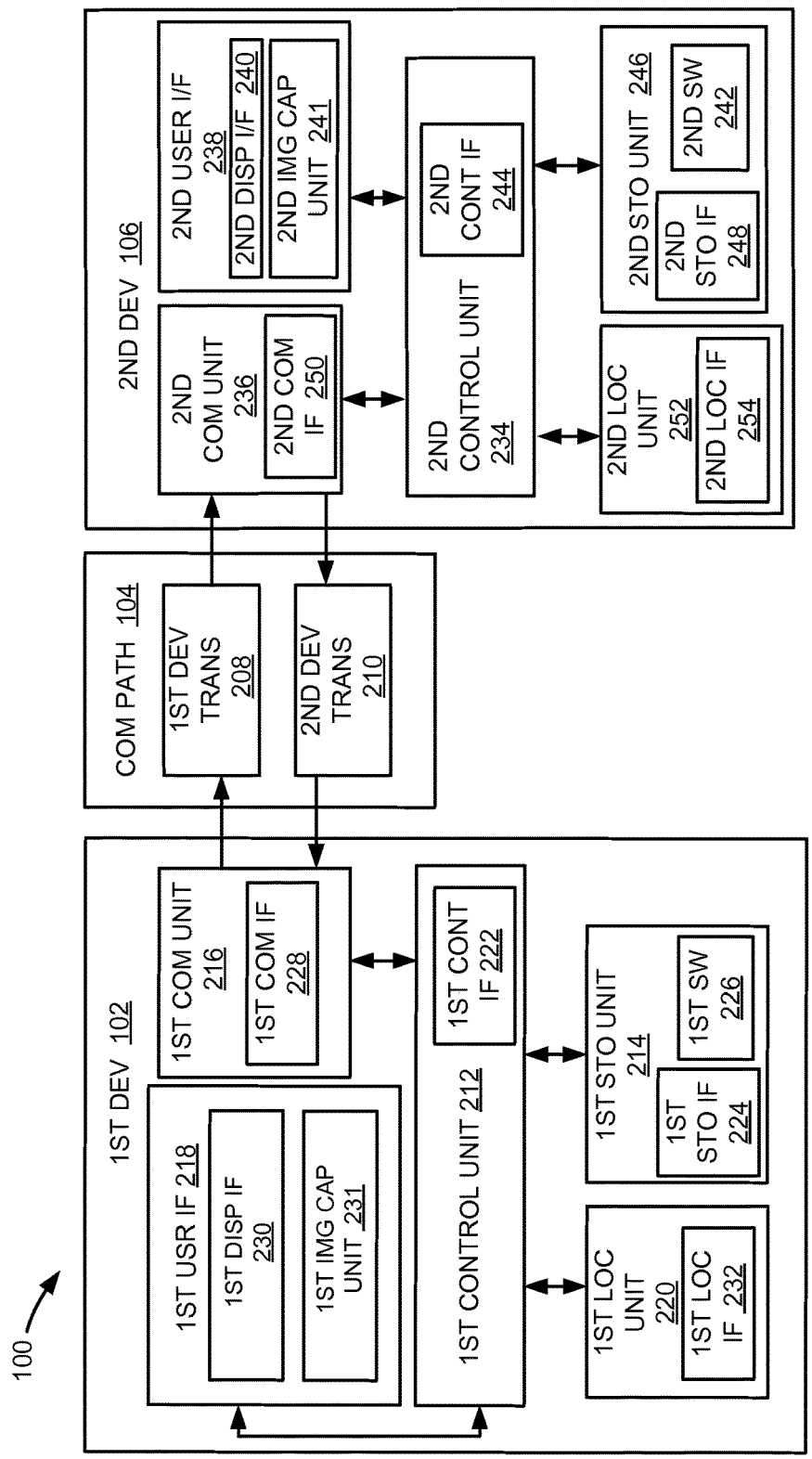
FIG. 2 is an example block diagram of the electronic system.

Referring now to FIG. 2, therein is shown an exemplary block diagram of the electronic system 100. The electronic system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For brevity of description in this embodiment of the present invention, the first device 102 will be described as the sensor 103 of FIG. 1 and the second device 106 will be described as a display device or a computing device with a display interface. Embodiments of the present invention are not limited to this selection for the type of devices. The selection is an example of the embodiments of the present invention.

The first device 102 can include a first control unit 212, a first storage unit 214, a first communication unit 216, a first user interface 218, and a first location unit 220. The first control unit 212 can include a first control interface 222. The first control unit 212 can execute a first software 226 to provide the intelligence of the electronic system 100. The first control unit 212 can be implemented in a number of different manners.

For example, the first control unit 212 can be a processor, an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first location unit 220 can generate a location information, a heading, and a speed of the first device 102, as examples. The first location unit 220 can be implemented in many ways. For example, the first location unit 220 can function as at least a part of a global positioning system (GPS), an inertial navigation system such as a gyroscope, an accelerometer, a magnetometer, a compass, a spectrum analyzer, a beacon, a cellular-tower location system, a pressure location system, or any combination thereof.

The first location unit 220 can include a first location interface 232. The first location interface 232 can be used for communication between the first location unit 220 and other functional units in the first device 102. The first location interface 232 can also be used for communication that is external to the first device 102.

The first location interface 232 can receive information from the other functional units or from external sources, or can transmit information to the other functional units or to external destinations. The external sources and the external destinations refer to sources and destinations external to the first device 102.

The first location interface 232 can include different implementations depending on which functional units or external units are being interfaced with the first location unit 220. The first location interface 232 can be implemented with technologies and techniques similar to the implementation of the first control interface 222.

The first storage unit 214 can store the first software 226. The first storage unit 214 can also store relevant information, such as advertisements, biometric information, points of interest (POIs), navigation routing entries, reviews/ratings, feedback, or any combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment such as a peripheral device or a notebook computer, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a first image capture unit 231, a microphone, a keypad, a touchpad, soft-keys, a keyboard, or any combination thereof to provide data and communication inputs.

The first image capture unit 231 can capture static images, video, light reflectance, IR signatures, UV signatures, or a combination thereof. The first image capture unit 231 can be implemented in many ways. For example, the first image capture unit 231 can be implemented as one or more two-dimensional (2D) cameras, three-dimensional (3D) cameras, stereoscopic cameras, optical sensors, low-light cameras, IR sensors, UV sensors, thermal imaging cameras, or a combination thereof. In addition, the first image capture unit 231 can include a depth sensor, a motion sensor, an active pixel sensor, a charge-coupled sensor, a CMOS sensor, or a combination thereof. As a more specific example, when the first image capture unit 231 is a 2D camera, the first device 102 can use computer vision to calculate a depth of a joint or body part.

Examples of the output device of the first user interface 218 can include a first display interface 230. The first display interface 230 can include a display, a projector, a video screen, a speaker, or any combination thereof.

For illustrative purposes, the first image capture unit 231 is shown as separate from the first display interface 230, however, it should be understood that the first image capture unit 231 can encompass any number of components of the first user interface 218 including a portion of the first display interface 230. In addition, while the first image capture unit 231 is shown as being embedded in the first device 102, it should be understood that the first image capture unit 231 can operate on the periphery or outside of the first device 102.

The first control unit 212 can operate the first user interface 218 to display information generated by the electronic system 100. The first control unit 212 can also execute the first software 226 for the other functions of the electronic system 100, including receiving location information from the first location unit 220. The first control unit 212 can further execute the first software 226 for interaction with the communication path 104 via the first communication unit 216.

The second device 106 can be optimized for implementing the various embodiments in a multiple device embodiment with the first device 102. The second device 106 can provide the additional or higher performance processing power compared to the first device 102. The second device 106 can include a second control unit 234, a second communication unit 236, a second user interface 238, and a second location unit 252.

The second user interface 238 allows the user to interface and interact with the second device 106. The second user interface 238 can include an input device and an output device.

Examples of the input device of the second user interface 238 can include a second image capture unit 241, a microphone, a keypad, a touchpad, soft-keys, a keyboard, or any combination thereof to provide data and communication inputs.

The second image capture unit 241 can capture static images, video, light reflectance, IR signatures, UV signatures, or a combination thereof. The second image capture unit 241 can be implemented in many ways. For example, the second image capture unit 241 can be implemented as one or more 2D cameras, 3D cameras, stereoscopic cameras, optical sensors, low-light cameras, IR sensors, UV sensors, thermal imaging cameras, or a combination thereof. In addition, the second image capture unit 241 can include a depth sensor, a motion sensor, an active pixel sensor, a charge-coupled sensor, a CMOS sensor, or a combination thereof. As a more specific example, when the second image capture unit 241 is a 2D camera, the second device 106 can use computer vision to calculate a depth of a joint or body part.

Examples of the output device of the second user interface 238 can include a second display interface 240. The second display interface 240 can include a display, a projector, a video screen, a speaker, or any combination thereof.

For illustrative purposes, the second image capture unit 241 is shown as separate from the second display interface 240, however, it should be understood that the second image capture unit 241 can encompass any number of components of the second user interface 238 including a portion of the second display interface 240. In addition, while the second image capture unit 241 is shown as being embedded in the second device 106, it should be understood that the second image capture unit 241 can operate on the periphery or outside of the second device 106.

The second location unit 252 can generate a location information, a heading, and a speed of the first device 102, as examples. The second location unit 252 can be implemented in many ways. For example, the second location unit 252 can function as at least a part of a global positioning system (GPS), an inertial navigation system such as a gyroscope, an accelerometer, a magnetometer, a compass, a spectrum analyzer, a beacon, a cellular-tower location system, a pressure location system, or any combination thereof.

The second location unit 252 can include a second location interface 254. The second location interface 254 can be used for communication between the second location unit 252 and other functional units in the second device 106. The second location interface 254 can also be used for communication that is external to the second device 106.

The second location interface 254 can receive information from the other functional units or from external sources, or can transmit information to the other functional units or to external destinations. The external sources and the external destinations refer to sources and destinations external to the second device 106.

The second location interface 254 can include different implementations depending on which functional units or external units are being interfaced with the second location unit 252. The second location interface 254 can be implemented with technologies and techniques similar to the implementation of the second control interface 244.

The second control unit 234 can execute a second software 242 to provide the intelligence of the second device 106 of the electronic system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the electronic system 100, including operating the second communication unit 236 to communicate with the first device 102 over the communication path 104.

The second control unit 234 can be implemented in a number of different manners. For example, the second control unit 234 can be a processor, an embedded processor, a microprocessor, a hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the relevant information, such as advertisements, biometric information, points of interest, navigation routing entries, reviews/ratings, feedback, or any combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the electronic system 100 is shown with the second storage unit 246 as a single hierarchy storage system, although it is understood that the electronic system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the second storage unit 246 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The electronic system 100 can be executed by the first control unit 212, the second control unit 234, or a combination thereof.

For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100. For example, the first device 102 is described to operate the first location unit 220, although it is understood that the second device 106 can also operate the first location unit 220. As an additional example, the second device 106 is described to operate the second location unit 252, although it is understood that the first device 102 can also operate the second location unit 252.

Figure 3:
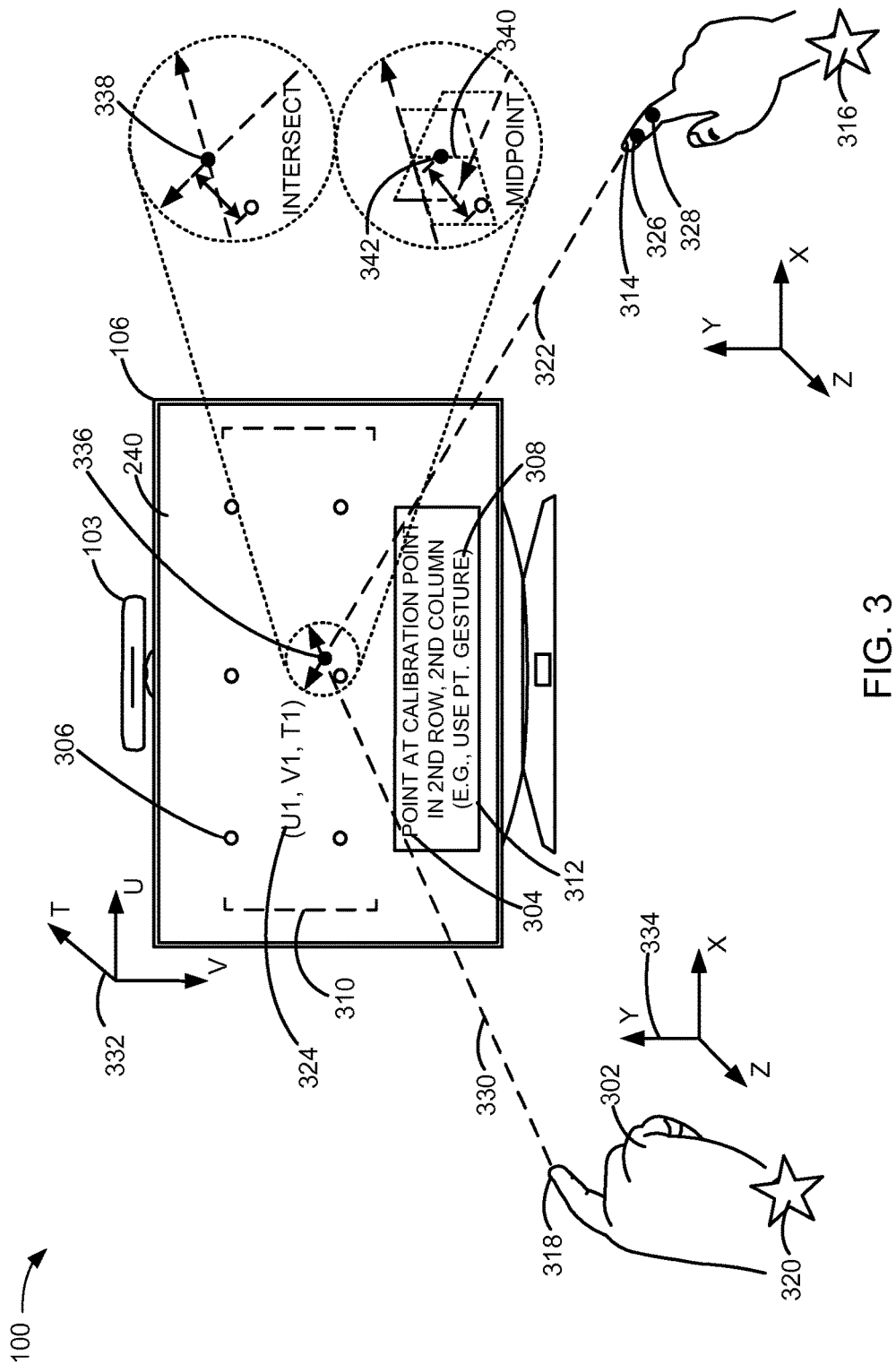
FIG. 3 is an example diagram of the electronic system in operation.

Referring now to FIG. 3, therein is shown an example diagram of the electronic system 100 in operation. FIG. 3 depicts a user 302 undertaking a calibration gesture 304 at a calibration point 306 displayed on a display interface, such as the second display interface 240 or the first display interface 230 of FIG. 2.

The calibration gesture 304 is a motion or positioning of an appendage of the user 302 directed at a device in the electronic system 100, such as the sensor 103, the second display interface 240, or a combination thereof. As an example, the calibration gesture 304 can include a pointing gesture 308, a touch gesture, an open palm gesture, a gun gesture, or a combination thereof. The pointing gesture 308 can involve the user 302 directing one or more fingers of the user 302 toward the sensor 103 or the second display interface 240. As an example, the user 302 can make the pointing gesture 308 by pointing the tip of an index finger at the second display interface 240.

The calibration point 306 is a graphic of a point or symbol displayed on a display interface. As depicted in FIG. 3, multiple instances of the calibration point 306 can be displayed as an array 310 on the display interface. The array 310 is a collection of multiple instances of the calibration point 306 arranged in a pattern or matrix. As an example, the array 310 can involve six instances of the calibration point 306 displayed in two rows of three.

The electronic system 100 can record a set of coordinates 324 for the calibration point 306 in a display coordinate system 332. The display coordinate system 332 is a coordinate system associated with a display interface such as the first display interface 230, the second display interface 240, or a combination thereof. As an example, the display coordinate system 332 can use as an origin point, a corner or center of the display interface. The display coordinate system 332 can be a multi-dimensional coordinate system such as a two-dimensional coordinate system or a three-dimensional coordinate system. As a more specific example, the display coordinate system 332 can be a three-dimensional Cartesian coordinate system.

The electronic system 100 can generate an instruction 312 informing the user 302 to direct the calibration gesture 304 at the calibration point 306. The instruction 312 can include a visual cue such as a light effect or a graphic, an audio cue such as an audio prompt, an image, a video, a text, or a combination thereof.

As depicted in FIG. 3, the user 302 can direct a first gesture 314 at the calibration point 306 in response to the instruction 312. The user 302 can direct the first gesture 314 at the calibration point 306 from a first position 316. The first gesture 314 is an instance of the calibration gesture 304 directed at the calibration point 306 from a first geographic position. The user 302 can also direct a second gesture 318 at the calibration point 306 from a second position 320 after undertaking the first gesture 314.

The first position 316 can be a geographic position or location different from the second position 320. As an example, the first position 316 can be a left corner of a living room and the second position 320 can be a right corner of the living room. As another example, the first position 316 and the second position 320 can be geographic positions on opposite sides of the calibration point 306.

As will be discussed in more detail below, the electronic system 100 can generate a first calibration vector 322 representing the first gesture 314. The first calibration vector 322 is a vector calculated in a sensor coordinate system 334 for calibrating one or more gestures made by the user 302. The sensor coordinate system 334 is a coordinate system associated with a sensor device or an image capture device. As an example, the sensor coordinate system 334 can be a coordinate system associated with the sensor 103. The sensor coordinate system 334 can be a multi-dimensional coordinate system such as a two-dimensional coordinate system or a three-dimensional coordinate system. As a more specific example, the sensor coordinate system 334 can be a three-dimensional Cartesian coordinate system.

The first calibration vector 322 can be generated from the first gesture 314 made at the first position 316. The electronic system 100 can generate the first calibration vector 322 by determining the coordinates 324 of an initial point 326 and a secondary point 328 on the calibration gesture 304. The electronic system 100 can then calculate the direction of the first calibration vector 322 by directing a line segment from the initial point 326 toward the secondary point 328. The line segment can then be extended toward a display interface to represent the first calibration vector 322. The electronic system 100 can determine the coordinates 324 of both of the initial point 326 and the secondary point 328 in a sensor coordinate system 334.

The initial point 326 is a point or location on an appendage of the user 302 serving as an origination point of a vector. As an example, the initial point 326 can be a joint or protrusion on an appendage of the user 302, such as a hand of the user 302. As a more specific example, the initial point 326 can include a metacarpo-phalangeal joint, a proximal interphalangeal joint, or a distal interphalangeal joint.

The secondary point 328 is a point or location on an appendage of the user 302 serving as a directional point of a vector. As an example, the secondary point 328 can also include a joint or protrusion on the appendage of the user 302, such as the hand of the user 302. As a more specific example, the secondary point 328 can include a fingertip, a proximal interphalangeal joint, or a distal interphalangeal joint.

The sensor coordinate system 334 is a coordinate system associated with an image capture unit such as the first image capture unit 231, the second image capture unit 241, or a combination thereof. As a more specific example, the sensor coordinate system 334 can be a coordinate system associated with a depth sensor. The sensor coordinate system 334 can be a multi-dimensional coordinate system such as a three-dimensional coordinate system. As a more specific example, the sensor coordinate system 334 can be a three-dimensional Cartesian coordinate system.

The electronic system 100 can also generate a second calibration vector 330 representing the second gesture 318. The second calibration vector 330 is another vector calculated in the sensor coordinate system 334 for calibrating one or more gestures made by the user 302. The second calibration vector 330 can be generated from the second gesture 318 made at the second position 320. Similar to the first calibration vector 322, the second calibration vector 330 can be generated using the first position 316 and the second position 320 of the second gesture 318 made at the second position 320.

The first calibration vector 322 and the second calibration vector 330 can intersect at an intersection 336. The intersection 336 is a point or region in three-dimensional space where two or more vectors, two or more planes, or at least one vector and one plane meet or cross. As an example, the intersection 336 can occur at an intersection point 338. The intersection point 338 is a point in space where two or more vectors or at least one vector and one plane meet or cross. For example, the first calibration vector 322 and the second calibration vector 330 can cross at the intersection point 338.

As another example, the electronic system 100 can approximate the intersection 336 by determining a midpoint 342 of a perpendicular intersecting segment 340 connecting the first calibration vector 322 and the second calibration vector 330. As will be discussed, the electronic system 100 can approximate the intersection 336 when the first calibration vector 322 and the second calibration vector 330 do not intersect at an actual point in space.

The perpendicular intersecting segment 340 is the shortest line segment connecting the first calibration vector 322 and the second calibration vector 330. The perpendicular intersecting segment 340 can be perpendicular to both the first calibration vector 322 and the second calibration vector 330. The electronic system 100 can use the midpoint 342 of the perpendicular intersecting segment 340 to approximate the intersection 336 when the first calibration vector 322 and the second calibration vector 330 do not intersect at an actual point in space.

Figure 4:
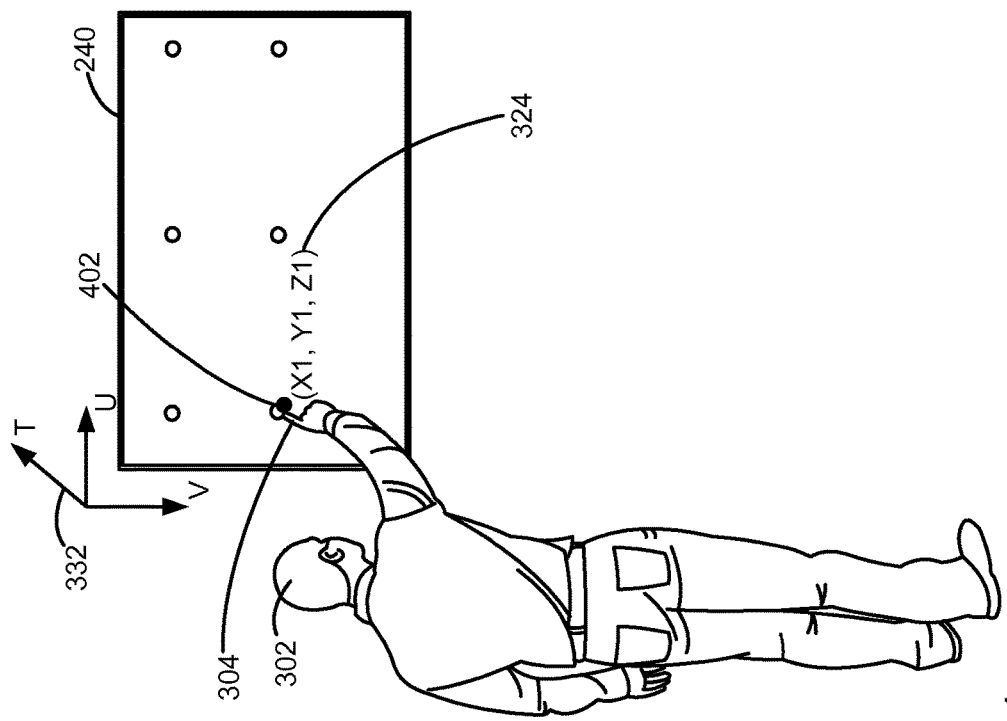
FIG. 4 is another example diagram of the electronic system in operation.
Figure 4:
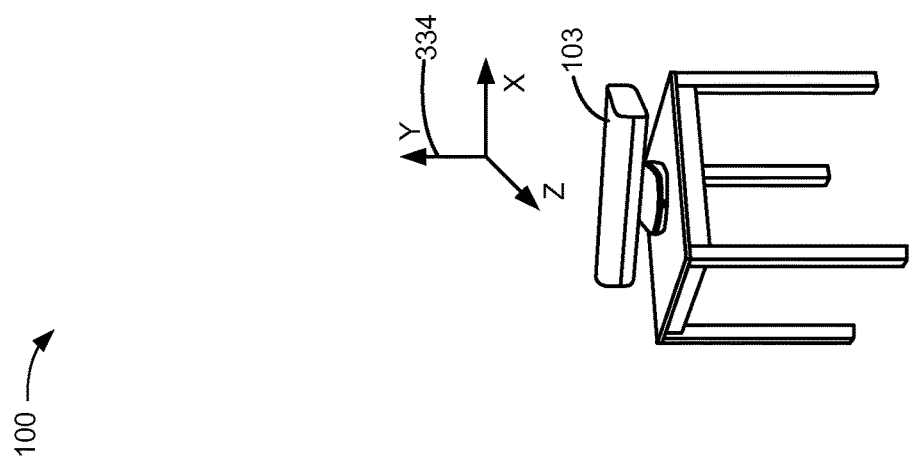

Referring now to FIG. 4, therein is shown another example diagram of the electronic system 100 in operation. FIG. 4 depicts the user 302 touching the calibration point 306 displayed on a display interface, such as the second display interface 240 or the first display interface 230 of FIG. 2. The user 302 can touch the calibration point 306 using an appendage of the user 302, such as a hand of the user 302, representing the calibration gesture 304. The electronic system 100 can display the array 310 of multiple instances of the calibration point 306 for directing the user 302 to touch different regions of the display interface. The electronic system 100 can also record the coordinates 324 of the calibration point 306 in the display coordinate system 332. As will be discussed in detail below, the electronic system 100 can display the calibration point 306 prior to the sensor 103 capturing the contact point 402.

As depicted in FIG. 4, the sensor 103 can be a standalone device separate from the second display interface 240. In this example, the sensor 103 can be placed behind the user 302 and can capture both the user 302 and the second display interface 240 in a field-of-view of the sensor 103.

The sensor 103 can also capture the coordinates 324 of a contact point 402 in the sensor coordinate system 334. The contact point 402 is a spatial position representing a point of contact between a gesture and a display interface. As an example, the contact point 402 can be a spatial position representing the point of contact between the calibration gesture 304 and the display interface 240.

Figure 5:
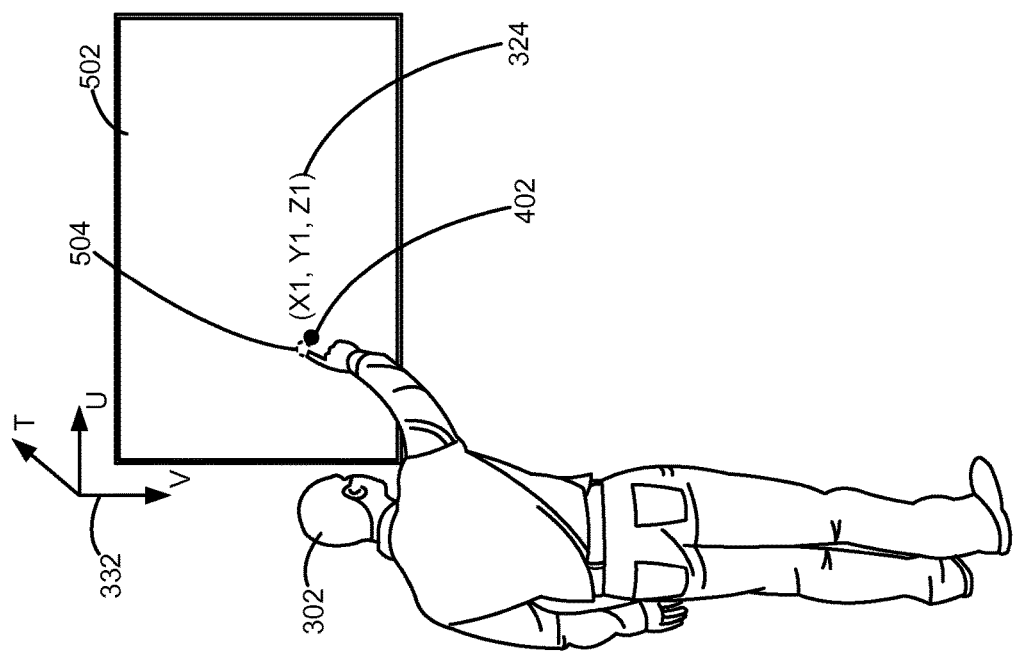
FIG. 5 is an additional example diagram of the electronic system in operation.
Figure 5:
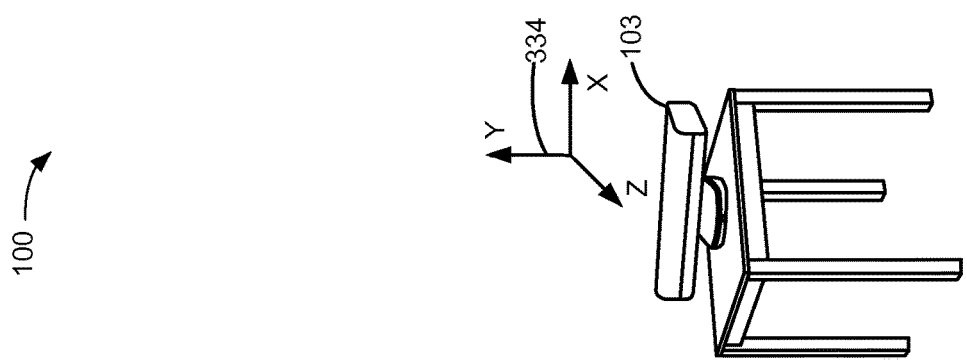

Referring now to FIG. 5, therein is shown an additional example diagram of the electronic system 100 in operation. FIG. 5 depicts the user 302 touching one or more arbitrary points on a touchscreen 502. The touchscreen 502 is a display interface capable of receiving a touch command to control a graphical user interface displayed on the display interface. The touchscreen 502 can include a capacitive touchscreen, a resistive touchscreen, or a combination thereof.

As depicted in FIG. 5, the sensor 103 can capture the contact point 402 when the user 302 touches one or more arbitrary positions or points on the touchscreen 502. In this example, the electronic system 100 can capture the coordinates 324 of the contact point 402 in the sensor coordinate system 334.

The electronic system 100 can also record the coordinates 324 of a touch position 504 in the display coordinate system 332. The touch position 504 is a point or region of the display interface touched by the user 302 as registered or recorded by the display interface. As an example, the touch position 504 can be the point or region where the touchscreen 502 registers or records the user 302 applying the calibration gesture 304 to the touchscreen 502. The touch position 504 can be registered or recorded by a display interface, such as the touchscreen 502, in the display coordinate system 332.

Figure 6:
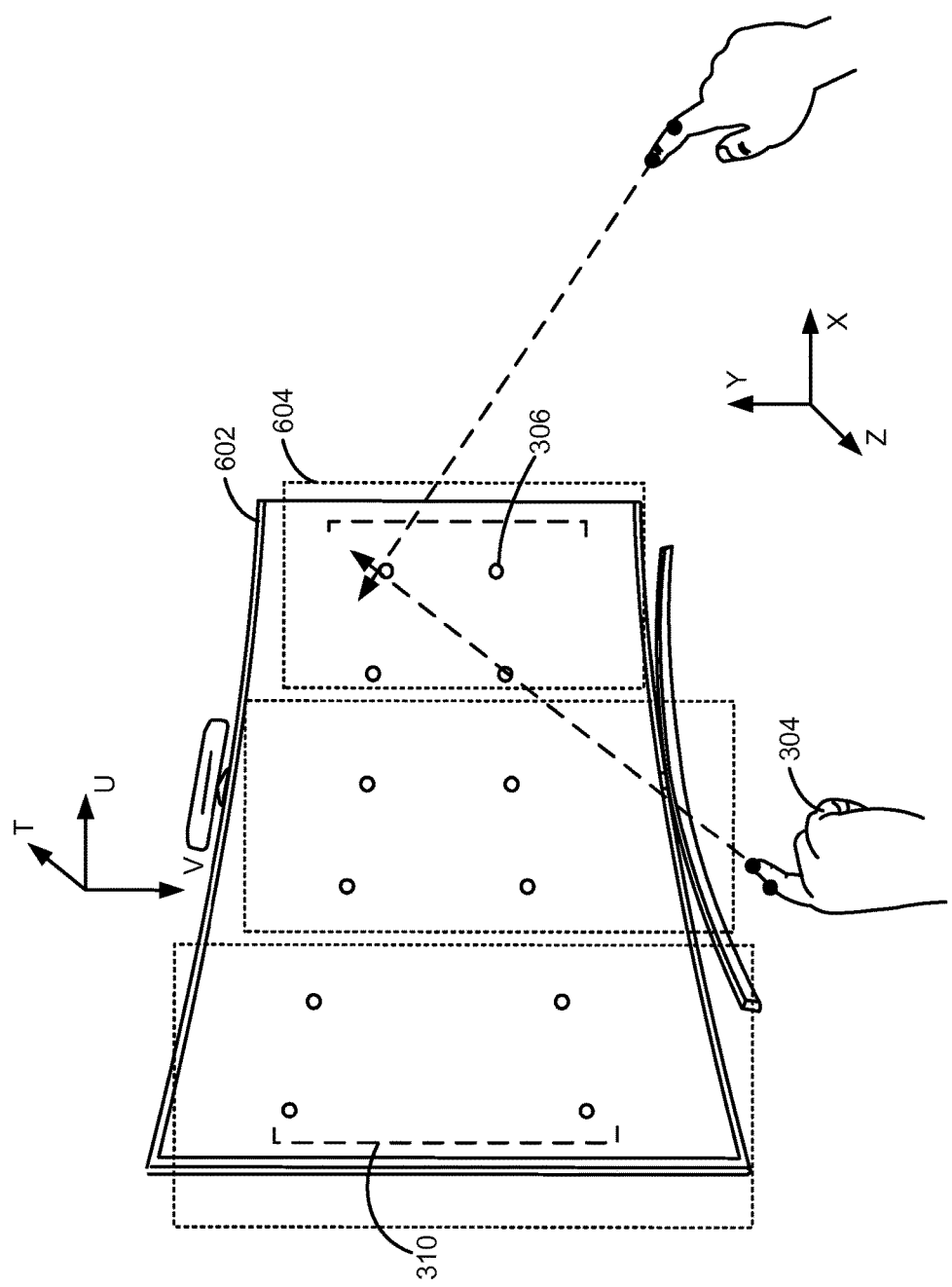
FIG. 6 is an example diagram of the electronic system in operation with a curved display.

Referring now to FIG. 6, therein is shown an example diagram of the electronic system 100 in operation with a curved display 602. The curved display 602 can include a curved television, a curved monitor, a flexible organic light emitting diode (OLED) display, a flexible active-matrix organic light emitting diode (AMOLED) display, an electronic paper display, or a combination thereof.

As will be discussed in detail below, the electronic system 100 can divide the curved display 602 into multiple display regions 604. The display regions 604 are sections or portions of a display interface grouped by a curvature of the display interface. As an example, electronic system 100 can divide the curved display 602 into the display regions 604 based on an angle of curvature of the display interface as calculated from a reference or center point of the curved display 602. As a more specific example, the display regions 604 can include a left display region, a center display region, and a right display region.

The electronic system 100 can divide the curved display 602 into the display regions 604 to display one or more instances of the calibration point 306 or the array 310 in each of the display regions 604. The electronic system 100 can also instruct the user 302 to direct the calibration gesture 304 to each of the display regions 604 to tailor the calibration to different areas of the curved display 602.

Alternatively, the electronic system 100 can apply the calibration methods discussed above to the curved display 602 without dividing the curved display 602 into multiple display regions 604. In this embodiment, the electronic system 100 can instruct the user 302 to direct the calibration gesture 304 at multiple instances of the calibration point 306 displayed on the curved display 602.

Figure 7:
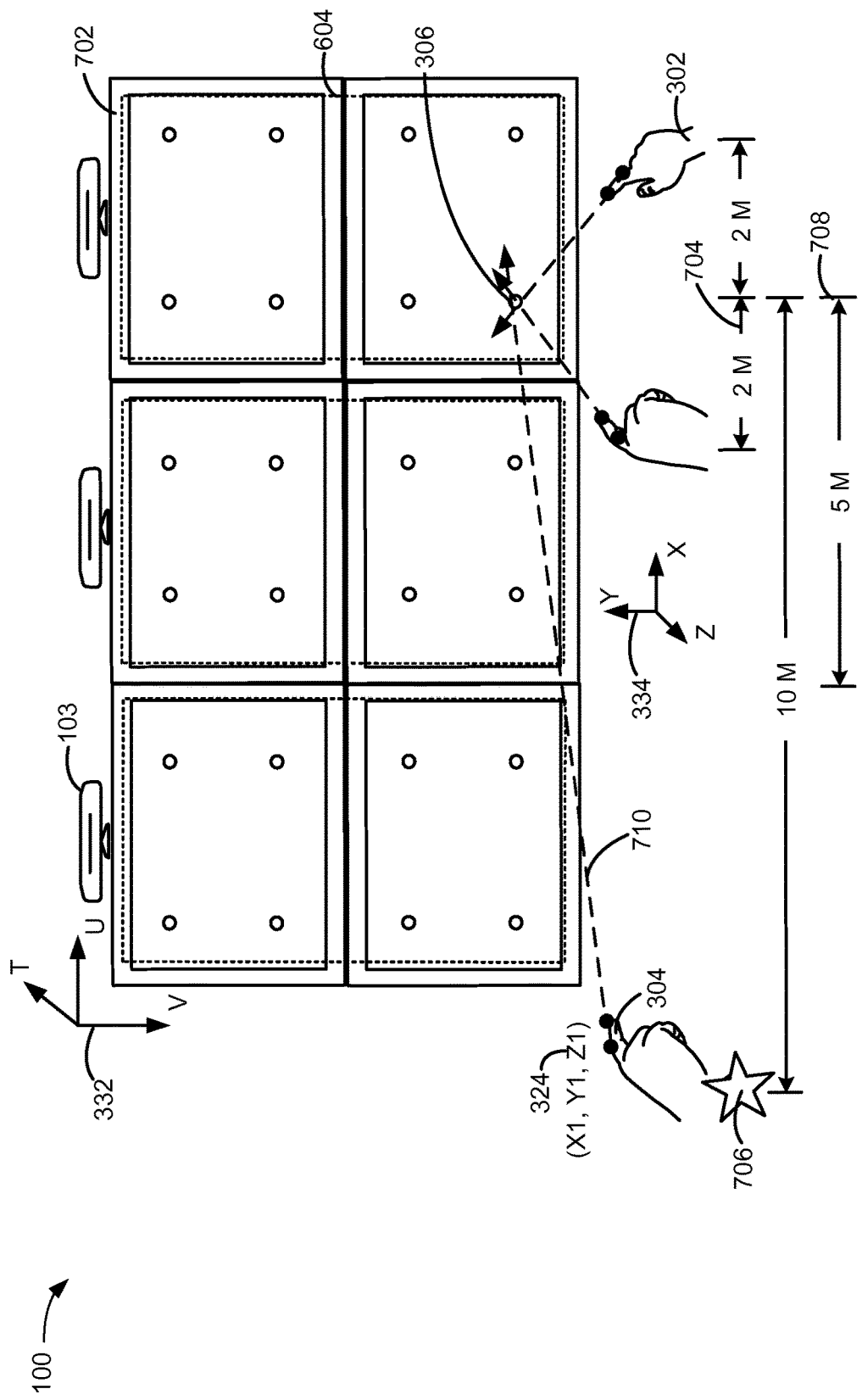
FIG. 7 is an example diagram of the electronic system in operation with a multiscreen display.

Referring now to FIG. 7, therein is shown an example diagram of the electronic system 100 in operation with a multiscreen display 702. The multiscreen display 702 can be a composite display interface made up of multiple smaller displays. As an example, the multiscreen display 702 can include multiple instance of the first display interface 230 of FIG. 2, the second display interface 240 of FIG. 2, or a combination thereof for depicting an extended display.

As will be discussed in detail below, the electronic system 100 can divide the multiscreen display 702 into the display regions 604. In addition, the electronic system 100 can calibrate one or more gestures of the user 302 based on a proximity 704 of the user 302 to one of the display regions 604 or the calibration point 306.

As an example, the electronic system 100 can determine the user 302 is making the calibration gesture 304 from a further position 706. The further position 706 is a geographic position of the user 302 beyond a maximum threshold distance. As an example, the further position 706 can be a geographic position of the user 302 beyond a calibration distance limit 708. The calibration distance limit 708 is a maximum threshold distance from an instance of the calibration point 306 used to calibrate a gesture of the user 302. The electronic system 100 can require the user 302 to determine a further calibration vector 710 when the user 302 is at the further position 706. The further calibration vector 710 is a vector calculated in the sensor coordinate system 334 for calibrating a gesture made by the user 302 at the further position 706.

As an example, the user 302 can undertake both the first gesture 314 and the second gesture 318 two meters from the calibration point 306. In this example, the electronic system 100 can calibrate the gestures of the user 302 from this two meter distance. Continuing with this example, the electronic system 100 can determine the user 302 is directing a gesture at the same area of the multiscreen display 702 from the further position 706 ten meters away. In this example, the calibration distance limit 708 can be five meters. Based on this example, the electronic system 100 can require the user 302 to direct a new instance of the calibration gesture 304 from the further position 706.

As depicted in FIG. 7, the electronic system 100 can use multiple instances of the sensor 103 to capture the coordinates 324 of the calibration gesture 304 in the sensor coordinate system 334. The electronic system 100 can also increase or decrease a number of instances of the sensor 103, the calibration point 306, the display regions 604, or a combination thereof based on a dimension of the multiscreen display 702.

Figure 8:
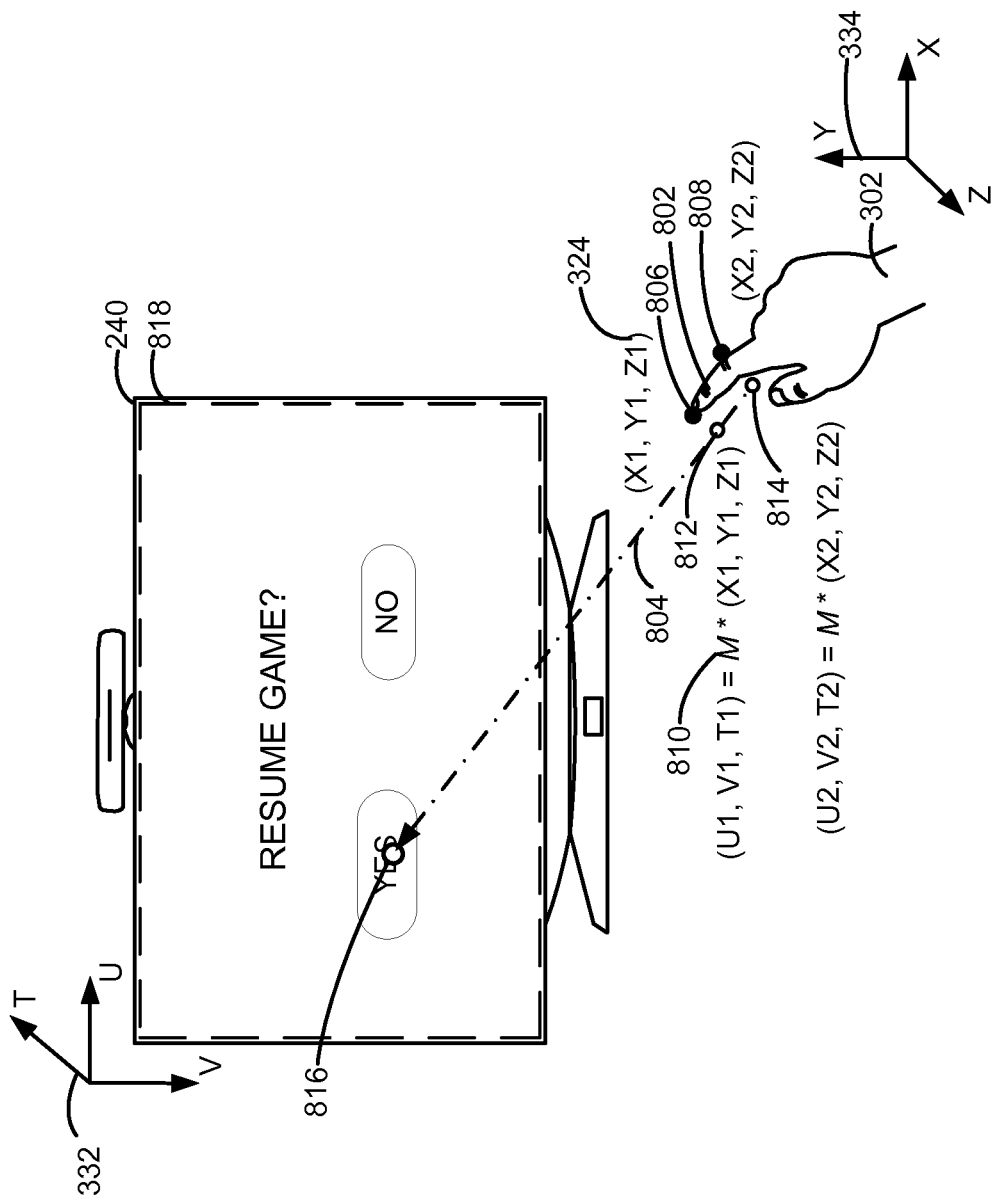
FIG. 8 is a further example diagram of the electronic system in operation.

Referring now to FIG. 8, therein is shown a further example diagram of the electronic system 100 in operation. FIG. 8 depicts the user 302 making a directive gesture 802 at a display interface such as the second display interface 240 or the first display interface 230 of FIG. 2.

The directive gesture 802 is a motion or positioning of the appendage of the user 302 for manipulating a graphic or user interface of a display interface. The directive gesture 802 can include the pointing gesture 308 of FIG. 3, an open palm gesture, a gun gesture, or a combination thereof.

As will be discussed in more detail below, the electronic system 100 can generate a ray casting vector 804 representing the directive gesture 802. The ray casting vector 804 is a geometric vector calculated in the sensor coordinate system 334 for manipulating a graphic or user interface of a display interface. The electronic system 100 can generate the ray casting vector 804 by first determining the coordinates 324 of a first appendage position 806 and a second appendage position 808 on the directive gesture 802.

The first appendage position 806 is a point or location on an appendage of the user 302 serving as an origination point of the ray casting vector 804. As an example, the first appendage position 806 can be a joint, a protrusion, or a physical feature on a hand of the user 302 as the user 302 makes the directive gesture 802. The first appendage position 806 can represent an origination point of the ray casting vector 804. The second appendage position 808 is another point or location on an appendage of the user 302. The second appendage position 808 can represent a directional point of the ray casting vector 804. As an example, the first appendage position 806 can be a proximal interphalangeal joint and the second appendage position 808 can be a fingertip of the user 302 as the user 302 makes the directive gesture 802.

The electronic system 100 can determine the coordinates 324 of the first appendage position 806 and the second appendage position 808 in the sensor coordinate system 334. The electronic system 100 can apply a transformation matrix 810 to the coordinates 324 of the first appendage position 806 and the second appendage position 808 to transform the coordinates 324 into the display coordinate system 332.

The transformation matrix 810 is an array of numbers, symbols, or expressions for changing the geospatial position of one or more points from one coordinate system into another coordinate system. The transformation matrix 810 will be discussed in more detail below.

The electronic system 100 can multiply the coordinates 324 of the first appendage position 806 and the second appendage position 808 in the sensor coordinate system 334 by the transformation matrix 810 to obtain a transformed first point 812 and a transformed second point 814, respectively.

The transformed first point 812 is a point obtained from multiplying the coordinates 324 of the first appendage position 806 with the transformation matrix 810. The transformed second point 814 is a point obtained from multiplying the coordinates 324 of the second appendage position 808 with the transformation matrix 810. The electronic system 100 can calculate the direction of the ray casting vector 804 by connecting a line segment from the transformed first point 812 toward the transformed second point 814. The electronic system 100 can then extend the ray casting vector 804 toward a display interface, such as the first display interface 230, the second display interface 240, or a combination thereof.

FIG. 8 also depicts a position indicator 816 displayed on a display interface, such as the first display interface 230, the second display interface 240, or a combination thereof. The position indicator 816 is a point on a display interface representing a meeting point of a vector and the display interface. As an example, the position indicator 816 can be the intersection point 338 of the ray casting vector 804 and a display plane 818 in the display coordinate system 332. The display plane 818 is a coordinate plane in the display coordinate system 332. As an example, the display plane 818 can be a coordinate plane comprised of a horizontal axis, such as the U-axis, and a vertical axis, such as the V-axis, in the display coordinate system 332. As a more specific example, the display plane 818 can correspond to a surface of the second display interface 240 including a screen surface.

Figure 9:
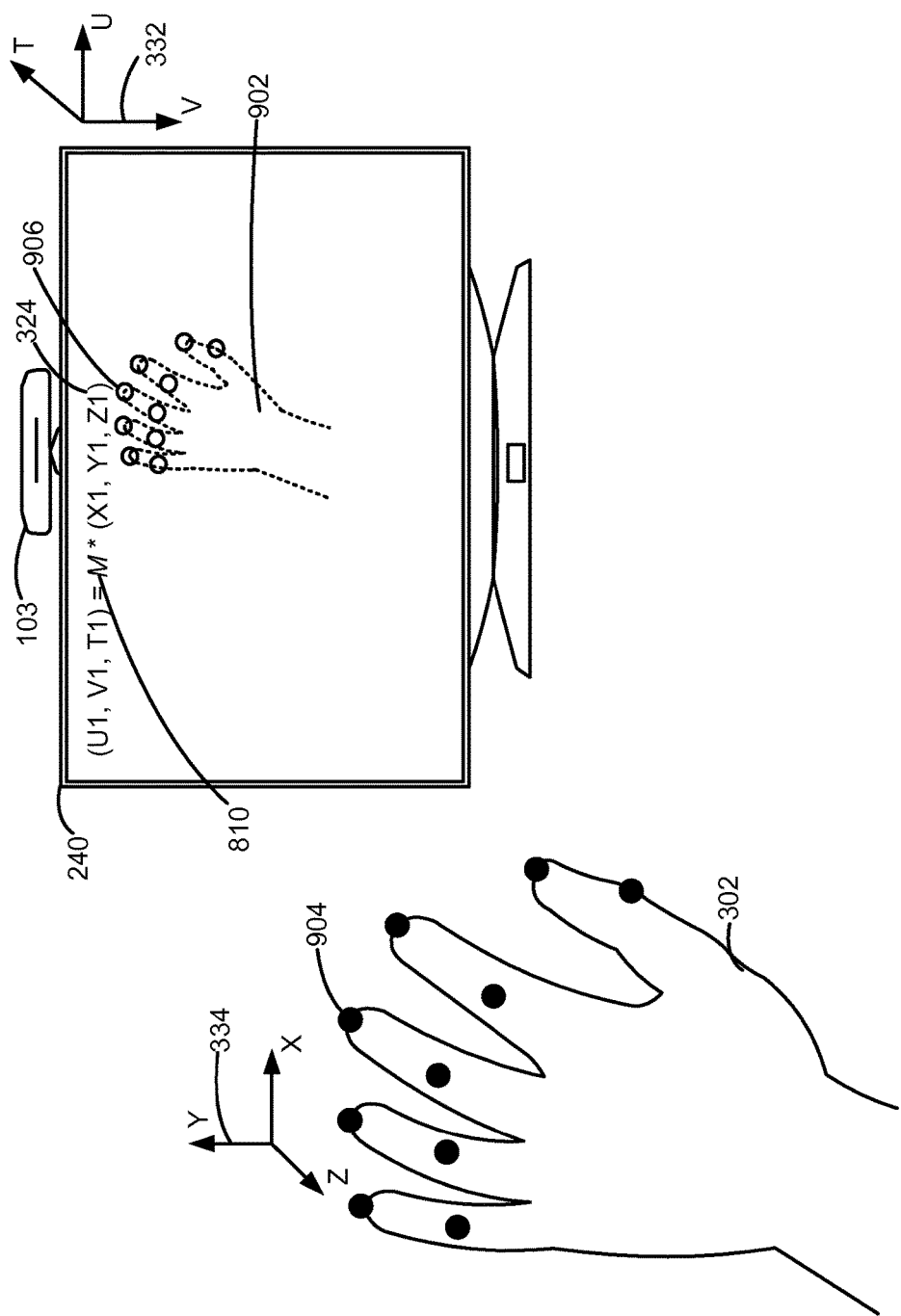
FIG. 9 is yet another example diagram of the electronic system in operation.

Referring now to FIG. 9, therein is shown yet another example diagram of the electronic system 100 in operation. FIG. 9 depicts an orthographic projection 902 of a hand of the user 302 displayed on a display interface such as the second display interface 240.

The electronic system 100 can generate the orthographic projection 902 by determining a reference point 904 on an appendage of the user 302. As an example, the electronic system 100 can generate the orthographic projection 902 by determining the reference point 904 on the directive gesture 802 made by the user 302. The reference point 904 is a point or location on an appendage of the user 302. The electronic system 100 can apply the transformation matrix 810 to the reference point 904 to obtain a transformed referencing point 906. The transformed referencing point 906 is a point obtained from transforming the geospatial position of a point from one coordinate system into another coordinate system.

As an example, the electronic system 100 can capture the coordinates 324 of the reference point 904 in the sensor coordinate system 334. The electronic system 100 can then multiply the coordinates 324 of the reference point 904 in the sensor coordinate system 334 by the transformation matrix 810 to obtain the coordinates 324 of the transformed referencing point 906. The electronic system 100 can then generate the orthographic projection 902 on a display interface at the transformed referencing point 906.

Figure 10:
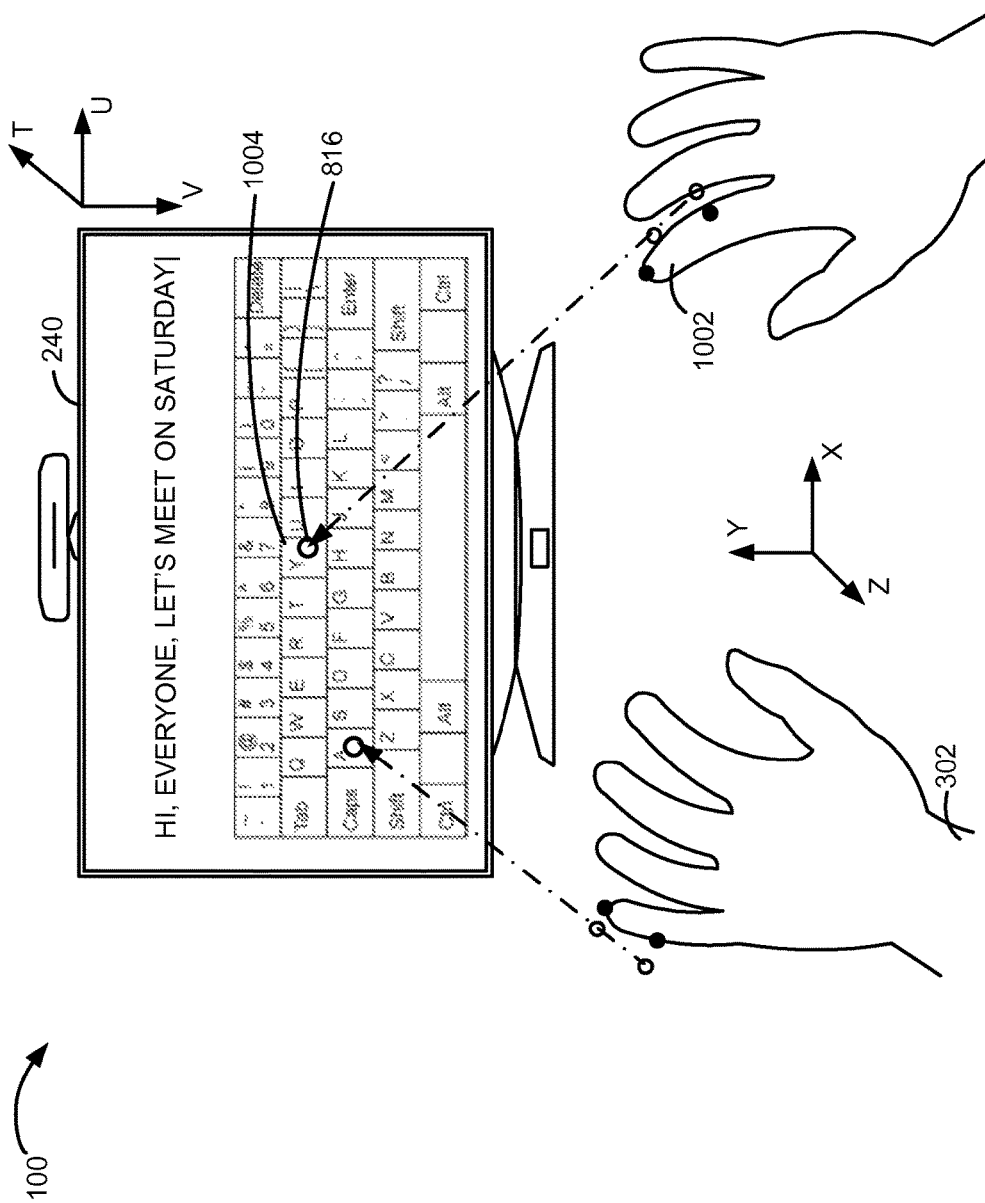
FIG. 10 is another example diagram of the electronic system in operation.

Referring now to FIG. 10, therein is shown another example diagram of the electronic system 100 in operation. FIG. 10 depicts the user 302 utilizing the electronic system 100 to type remotely using finger gestures. As a more specific example, FIG. 10 depicts the user 302 directing a typing gesture 1002 at a keyboard key 1004.

The typing gesture 1002 can be an instance of the directive gesture 802 of FIG. 8 for manipulating a keyboard graphic displayed on a display interface such as the second display interface 240. As an example, the typing gesture 1002 can involve the user 302 raising one or more fingertips in the direction of a display interface depicting the keyboard graphic.

As will be discussed in detail below, the electronic system 100 can place the position indicator 816 over a keyboard key 1004. The keyboard key 1004 is a graphic of a keyboard letter, number, symbol, or a combination thereof displayed on the display interface. As a more specific example, the keyboard graphic can be of a QWERTY-type keyboard displayed on the second display interface 240.

Figure 11:
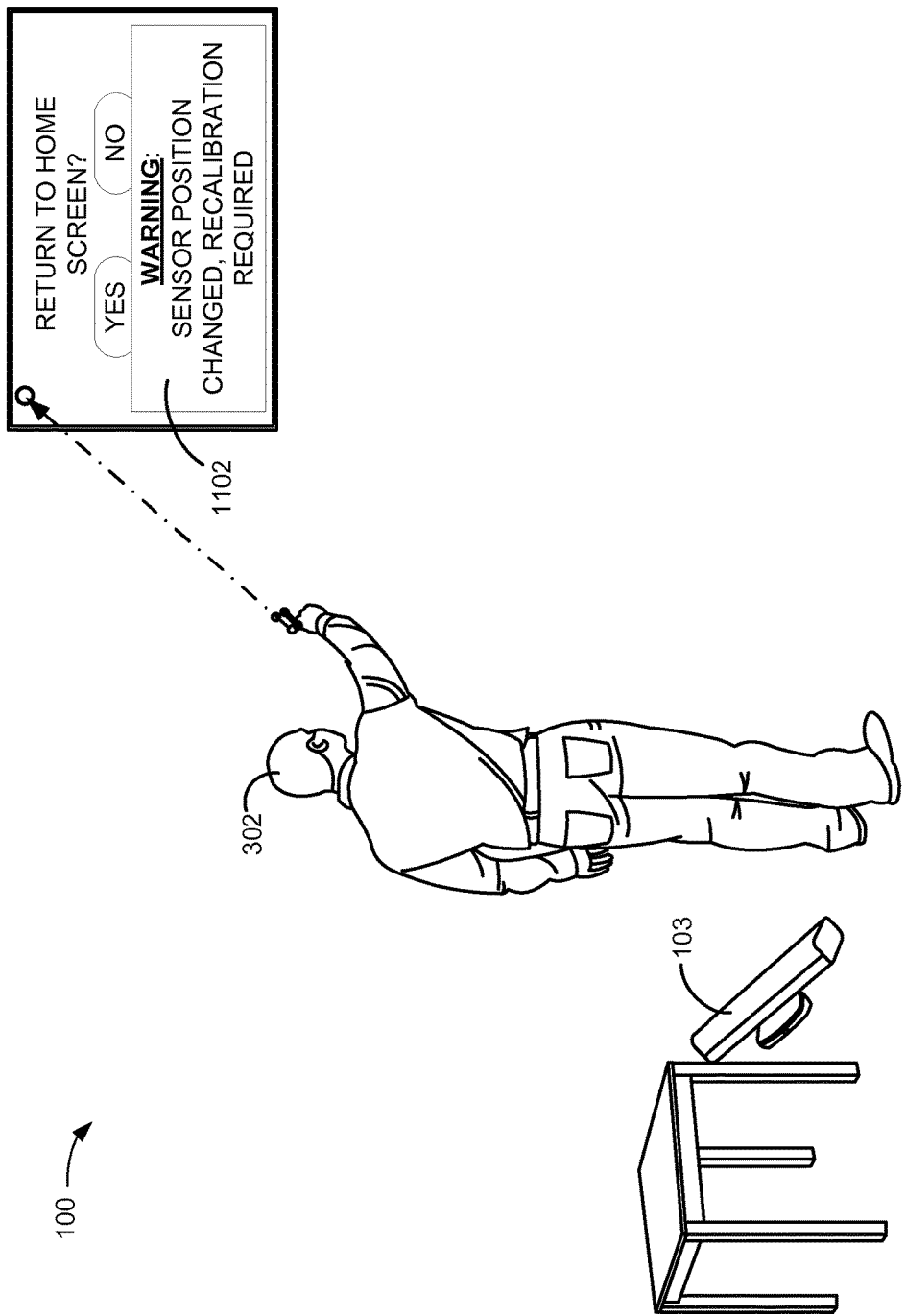
FIG. 11 is an additional example diagram of the electronic system in operation.

Referring now to FIG. 11, therein is shown an additional example diagram of the electronic system 100 in operation. FIG. 11 depicts the user 302 recalibrating the electronic system 100. The user 302 can recalibrate the electronic system 100 in response to a recalibration notification 1102. The recalibration notification 1102 is a communication from the electronic system 100 recommending the user 302 to recalibrate one or more gestures directed at a display interface. The recalibration notification 1102 can include audio communications, text messages, visual cues, or a combination thereof.

As will be discussed in detail below, the electronic system 100 can generate the recalibration notification 1102 when the electronic system 100 detects a change in an orientation or location of the sensor 103. As depicted in FIG. 11, the electronic system 100 can generate the recalibration notification 1102 when the sensor 103 has fallen off of a table.

Figure 12:
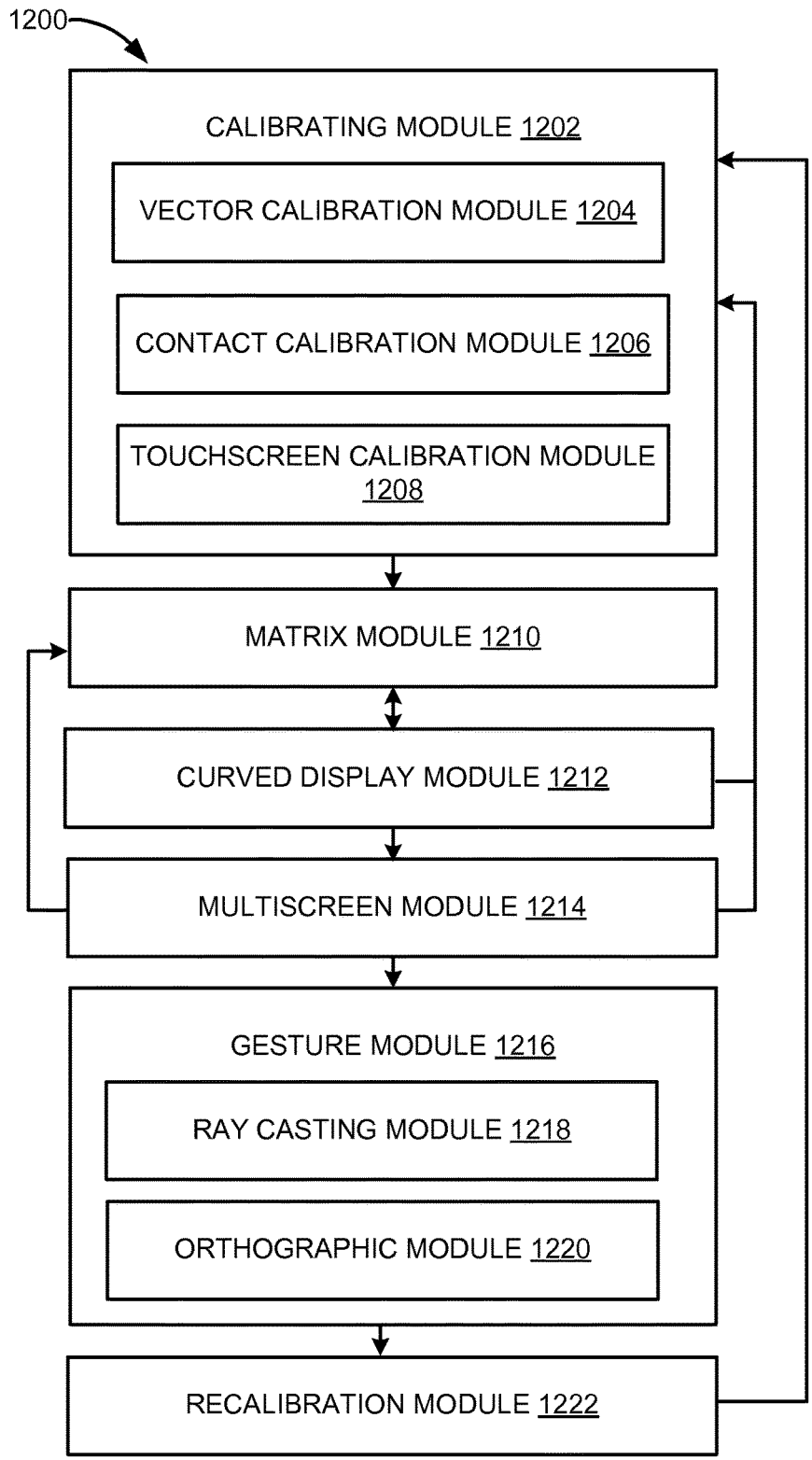
FIG. 12 is a control flow of the electronic system.

Referring now to FIG. 12, therein is shown a control flow 1200 of the electronic system 100 of FIG. 1. The electronic system 100 can include a calibrating module 1202, a matrix module 1210, a curved display module 1212, a multiscreen module 1214, a gesture module 1216, a recalibration module 1222, or a combination thereof.

The calibrating module 1202 is configured to calibrate one or more gestures directed at a display interface such as the second display interface 240 of FIG. 2. The calibrating module 1202 can include a vector calibration module 1204, a contact calibration module 1206, a touchscreen calibration module 1208, or a combination thereof.

The calibrating module 1202 can calibrate the one or more gestures by recording the coordinates 324 of FIG. 3 of the calibration point 306 of FIG. 3 or the touch position 504 of FIG. 5 in the display coordinate system 332 of FIG. 3. In addition, the calibrating module 1202 can also calculate the coordinates 324 of the intersection point 338 of FIG. 3, the midpoint 342 of FIG. 3, or the contact point 402 of FIG. 4 in the sensor coordinate system 334 of FIG. 3. The calibrating module 1202 will be discussed in more detail below.

The calibrating module 1202 can be part of the first software 226 of FIG. 2, the second software 242 of FIG. 2, or a combination thereof. The first control unit 212 of FIG. 2 can execute the first software 226, the second control unit 234 of FIG. 2 can execute the second software 242, or a combination thereof to record the coordinates 324 of the calibration point 306 and the touch position 504 in the display coordinate system 332 and calculate the coordinates 324 of the intersection point 338, the midpoint 342, or the contact point 402 in the sensor coordinate system 334.

The calibrating module 1202 can also be implemented as hardware circuitry or hardware accelerators in the first control unit 212, the second control unit 234, or a combination thereof. In addition, the calibrating module 1202 can also be implemented as hardware circuitry or hardware accelerators in the first device 102 of FIG. 1, the second device 106 of FIG. 1, or a combination thereof but outside of the first control unit 212, the second control unit 234, or a combination thereof.

Moreover, the calibrating module 1202 can also communicate the coordinates 324 of the calibration point 306, the touch position 504, the intersection point 338, the midpoint 342, or the contact point 402 to other modules in the control flow 1200 or other devices of the electronic system 100 through the first communication unit 216 of FIG. 2, the second communication unit 236 of FIG. 2, or a combination thereof. After recording the coordinates 324 of the calibration point 306 and the touch position 504 in the display coordinate system 332 and calculating the coordinates 324 of the intersection point 338, the midpoint 342, or the contact point 402 in the sensor coordinate system 334, the control flow 1200 of FIG. 12 can pass from the calibrating module 1202 to the matrix module 1210.

The matrix module 1210 is configured to generate the transformation matrix 810 of FIG. 3. The matrix module 1210 can generate the transformation matrix 810 based on the calibration point 306 or the touch position 504 in the display coordinate system 332 and the intersection point 338, the midpoint 342, or the contact point 402 in the sensor coordinate system 334.

The matrix module 1210 can generate the transformation matrix 810 for transforming the coordinates 324 of a point from one coordinate system to another coordinate system. As an example, the matrix module 1210 can generate the transformation matrix 810 to transform an appendage position of the directive gesture 802 of FIG. 8 from the sensor coordinate system 334 to the display coordinate system 332.

The matrix module 1210 can use the first control unit 212, the second control unit 234, or a combination thereof to generate the transformation matrix 810. As an example, the matrix module 1210 can use the first control unit 212, the second control unit 234, or a combination thereof to generate the transformation matrix 810 by using a least-squares error minimization method. As a more specific example, the matrix module 1210 can use the first control unit 212, the second control unit 234, or a combination thereof to generate the transformation matrix 810 using an absolute orientation least-squares error method.

In this example, the matrix module 1210 can take as input parameters the coordinates 324 of the calibration point 306 in the display coordinate system 332 and any of the intersection point 338, the midpoint 342, or the contact point 402 in the sensor coordinate system 334. Also, as an example, the matrix module 1210 can take as input parameters the coordinates 324 of the touch position 504 in the display coordinate system 332 and the coordinates 324 of the contact point 402 in the sensor coordinate system 334.

As another example, the matrix module 1210 can use the first control unit 212, the second control unit 234, or a combination thereof to generate the transformation matrix 810 using a quaternion estimation method. As a more specific example, the matrix module 1210 can use the first control unit 212, the second control unit 234, or a combination thereof to generate the transformation matrix 810 by calculating a closed-form solution using unit quaternions.

In this example, the matrix module 1210 can take as input parameters the coordinates 324 of the calibration point 306 in the display coordinate system 332 and any of the intersection point 338, the midpoint 342, or the contact point 402 in the sensor coordinate system 334. Also, as an example, the matrix module 1210 can take as input parameters the coordinates 324 of the touch position 504 in the display coordinate system 332 and the coordinates 324 of the contact point 402 in the sensor coordinate system 334. The matrix module 1210 can store the transformation matrix 810 in the first storage unit 214 of FIG. 2, the second storage unit 246 of FIG. 2, or a combination thereof.

The matrix module 1210 can be part of the first software 226, the second software 242, or a combination thereof. The first control unit 212 can execute the first software 226, the second control unit 234 can execute the second software 242, or a combination thereof to generate the transformation matrix 810.

The matrix module 1210 can also be implemented as hardware circuitry or hardware accelerators in the first control unit 212, the second control unit 234, or a combination thereof. In addition, the matrix module 1210 can also be implemented as hardware circuitry or hardware accelerators in the first device 102, the second device 106, or a combination thereof but outside of the first control unit 212, the second control unit 234, or a combination thereof.

Moreover, the matrix module 1210 can also communicate the transformation matrix 810 to other modules in the control flow 1200 or other devices of the electronic system 100 through the first communication unit 216, the second communication unit 236, or a combination thereof. After generating the transformation matrix 810, the control flow 1200 of FIG. 12 can pass from the matrix module 1210 to the curved display module 1212.

The curved display module 1212 is configured to generate multiple instances of the transformation matrix 810 when the display interface, such as the first display interface 230 or the second display interface 240 is the curved display 602 of FIG. 6. For illustrative purposes, the curved display module 1212 is shown as part of the control flow 1200, although it is understood that the curved display module 1212 can be optional for other embodiments of the present invention. As an example, the curved display module 1212 can determine whether the display interface is the curved display 602 based on a device identification number, a model number, a selection by the user 302 of FIG. 3, or a combination thereof. The curved display module 1212 can pass the control flow 1200 directly to either the multiscreen module 1214 or the gesture module 1216 when the display interface is determined not to be the curved display 602.

The curved display module 1212 can work with the calibrating module 1202 and the matrix module 1210 to generate multiple instances of the transformation matrix 810. The curved display module 1212 can first divide the curved display 602 into the display regions 604 of FIG. 6. As an example, the display regions 604 can include a center display region, a left display region, and a right display region. As another example, the display regions 604 can include a left display region and a right display region. As yet another example, the display regions 604 can include an upper region and a lower region. As a more specific example, the curved display module 1212 can divide the curved display 602 into the display regions 604 based on an angle of curvature from a center point of the curved display 602.

The curved display module 1212 can generate an instance of the transformation matrix 810 for each of the display regions 604. As an example, the curved display module 1212 can pass the control flow 1200 back to the calibrating module 1202 to generate one instance of the array 310 of FIG. 3 for one of the display regions 604. In this example, the calibrating module 1202 can also generate an instance of the instruction 312 of FIG. 3 directing the user 302 to point at or touch one or more instances of the calibration point 306 in one of the display regions 604. Alternatively, when the display interface is the touchscreen 502 of FIG. 5, the calibrating module 1202 can generate an instance of the instruction 312 directing the user 302 to touch a number of arbitrary points in one of the display regions 604.

The calibrating module 1202 can store the coordinates 324 of the calibration point 306 or the touch position 504 in the first storage unit 214, the second storage unit 246, or a combination thereof. The calibrating module 1202 can then calculate the coordinates 324 of the intersection point 338 or the midpoint 342 based on the intersection 336 of the first calibration vector 322 of FIG. 3 and the second calibration vector 330 of FIG. 3. As an alternative example, the calibrating module 1202 can calculate the coordinates 324 of the contact point 402 based on the user 302 touching the display interface, such as the second display interface 240, with the calibration gesture 304 of FIG. 3.

Once the calibrating module 1202 has calculated the coordinates 324 of the intersection point 338, the midpoint 342, or the contact point 402, the control flow 1200 can pass to the matrix module 1210 to generate an instance of the transformation matrix 810 for one of the display regions 604. The matrix module 1210 can use the coordinates 324 of the calibration point 306 or the touch position 504 in the display coordinate system 332 and the coordinates 324 of the intersection point 338, the midpoint 342, or the contact point 402 in the sensor coordinate system 334 to generate the transformation matrix 810.

After the matrix module 1210 generates the transformation matrix 810, the curved display module 1212 can pass the control flow 1200 back to the calibrating module 1202 to display another instance of the array 310 in another one of the display regions 604. The curved display module 1212 can iteratively pass the control flow 1200 back to the calibrating module 1202 and the matrix module 1210 until each of the display regions 604 of the curved display 602 has its own instance of the transformation matrix 810.

The curved display module 1212 can retrieve the appropriate instance of the transformation matrix 810 from the first storage unit 214, the second storage unit 246, or a combination thereof based on the coordinates 324 of the position indicator 816 of FIG. 8 generated by the directive gesture 802. The curved display module 1212 can also communicate the appropriate instance of the transformation matrix 810 to the gesture module 1216 based on the coordinates 324 of the position indicator 816 relative to the display regions 604.

The curved display module 1212 can be part of the first software 226, the second software 242, or a combination thereof. The first control unit 212 can execute the first software 226, the second control unit 234 can execute the second software 242, or a combination thereof to generate multiple instances of the transformation matrix 810.

The curved display module 1212 can also be implemented as hardware circuitry or hardware accelerators in the first control unit 212, the second control unit 234, or a combination thereof. In addition, the curved display module 1212 can also be implemented as hardware circuitry or hardware accelerators in the first device 102, the second device 106, or a combination thereof but outside of the first control unit 212, the second control unit 234, or a combination thereof.

Moreover, the curved display module 1212 can also communicate the multiple instances of the transformation matrix 810 to other modules in the control flow 1200 or other devices of the electronic system 100 through the first communication unit 216, the second communication unit 236, or a combination thereof. After generating the multiple instances of the transformation matrix 810, the control flow 1200 of FIG. 12 can pass from the curved display module 1212 to the multiscreen module 1214.

The multiscreen module 1214 is configured to generate multiple instances of the transformation matrix 810 when the display interface is the multiscreen display 702 of FIG. 7. For illustrative purposes, the multiscreen module 1214 is shown as part of the control flow 1200, although it is understood that the multiscreen module 1214 can be optional for other embodiments of the present invention. As an example, the multiscreen module 1214 can determine whether the display interface is part of the multiscreen display 702 based on a display setting, a display configuration, a selection by the user 302, or a combination thereof. The multiscreen module 1214 can pass the control flow 1200 directly to the gesture module 1216 when the display interface is determined not to be the multiscreen display 702.

The multiscreen module 1214 can work with the calibrating module 1202 and the matrix module 1210 to generate multiple instances of the transformation matrix 810. The multiscreen module 1214 can generate multiples instances of the transformation matrix 810 based on the display regions 604, the proximity 704 of FIG. 7 of the user 302, or a combination thereof.

As an example, the multiscreen module 1214 can divide the multiscreen display 702 into the display regions 604. As a more specific example, the multiscreen module 1214 can divide the multiscreen display 702 into the display regions 604 based on the display interfaces making up the multiscreen display 702. As another specific example, the multiscreen module 1214 can divide the multiscreen display 702 into the display regions 604 based on a dimension of the multiscreen display 702 such as a length or a width of the multiscreen display 702.

The multiscreen module 1214 can generate an instance of the transformation matrix 810 for each of the display regions 604. As an example, the multiscreen module 1214 can pass the control flow 1200 back to the calibrating module 1202 to generate one instance of the array 310 for each of the display regions 604. In this example, the calibrating module 1202 can also generate an instance of the instruction 312 directing the user 302 to point at or touch one or more instances of the calibration point 306 in one of the display regions 604. Alternatively, when the multiscreen display 702 is made up of one or more instances of the touchscreen 502, the calibrating module 1202 can generate an instance of the instruction 312 directing the user 302 to touch a number of arbitrary points in the display regions 604 with the touchscreen 502.

The calibrating module 1202 can store the coordinates 324 of the calibration point 306 or the touch position 504 in the first storage unit 214, the second storage unit 246, or a combination thereof. The calibrating module 1202 can then capture the first gesture 314 of FIG. 3 and the second gesture 318 of FIG. 3 to generate the first calibration vector 322 and the second calibration vector 330, respectively. For example, the calibrating module 1202 can use one instance of the sensor 103 to capture the first gesture 314 and the second gesture 318. Also, for example, the calibrating module 1202 can use multiple instances of the sensor 103 to capture the first gesture 314 and the second gesture 318. As a more specific example, each of the display regions 604 or each of the display interfaces can rely on a different instance of the sensor 103 to capture the calibration gesture 304 directed at that particular display region or display interface.

The calibrating module 1202 can calculate the coordinates 324 of the intersection point 338 or the midpoint 342 based on the intersection 336 of the first calibration vector 322 and the second calibration vector 330. As an alternative example, the calibrating module 1202 can calculate the coordinates 324 of the contact point 402 based on the user 302 touching the display interface, such as the second display interface 240, with the calibration gesture 304.

Once the calibrating module 1202 has calculated the coordinates 324 of the intersection point 338, the midpoint 342, or the contact point 402, the control flow 1200 can pass to the matrix module 1210 to generate an instance of the transformation matrix 810 for one of the display regions 604. The matrix module 1210 can use the coordinates 324 of the calibration point 306 or the touch position 504 in the display coordinate system 332 and the coordinates 324 of the intersection point 338, the midpoint 342, or the contact point 402 in the sensor coordinate system 334 to generate the transformation matrix 810.

After the matrix module 1210 generates the transformation matrix 810, the multiscreen module 1214 can pass the control flow 1200 back to the calibrating module 1202 to display another instance of the array 310 in another one of the display regions 604. The multiscreen module 1214 can iteratively pass the control flow 1200 back to the calibrating module 1202 and the matrix module 1210 until each of the display regions 604 of the multiscreen display 702 has its own instance of the transformation matrix 810.

As another example, the multiscreen module 1214 can generate multiple instances of the transformation matrix 810 based on the proximity 704 of the user 302 to the calibration point 306 during the calibration process. The multiscreen module 1214 can generate multiple instances of the transformation matrix 810 when the proximity 704 of the user 302 to the calibration point 306 exceeds the calibration distance limit 708 of FIG. 7.

As a more specific example, the multiscreen module 1214 can use one or more instances of the sensor 103 to determine the proximity 704 of the user 302 to the calibration point 306. The multiscreen module 1214 can determine the geographic position of the user 302 as the further position 706 of FIG. 7 when the proximity 704 of the user 302 to the calibration point 306 exceeds the calibration distance limit 708. The calibration distance limit 708 can be determined by the electronic system 100 or dictated by the sensing abilities of the sensor 103. For example, the calibration distance limit 708 can be determined based on a dimension of the multiscreen display 702.

The calibrating module 1202 can generate the further calibration vector 710 of FIG. 7 when the proximity 704 of the user 302 to the calibration point 306 exceeds the calibration distance limit 708. The calibrating module 1202 can generate the further calibration vector 710 by using the sensor 103 to capture the coordinates 324 of the calibration gesture 304 made by the user 302 at the further position 706. The calibrating module 1202 can use the further calibration vector 710 and either the first calibration vector 322 or the second calibration vector 330 to calculate the coordinates 324 of the intersection point 338 of FIG. 3. In this example, both the first position 316 of FIG. 3 and the second position 320 of FIG. 3 are within the calibration distance limit 708.

Once the calibrating module 1202 has calculated the coordinates 324 of the intersection point 338, the control flow 1200 can pass to the matrix module 1210 to generate an instance of the transformation matrix 810 for the further position 706. The matrix module 1210 can use the coordinates 324 of the calibration point 306 in the display coordinate system 332 and the coordinates 324 of the intersection point 338 in the sensor coordinate system 334 to generate the transformation matrix 810.

The multiscreen module 1214 can communicate the appropriate instance of the transformation matrix 810 to the gesture module 1216 based on the proximity 704 of the user 302 to the calibration point 306 displayed on the multiscreen display 702. In addition, the multiscreen module 1214 can also communicate the appropriate instance of the transformation matrix 810 to the gesture module 1216 based on the coordinates 324 of the position indicator 816 relative to the display regions 604 on the multiscreen display 702.

The multiscreen module 1214 can be part of the first software 226, the second software 242, or a combination thereof. The first control unit 212 can execute the first software 226, the second control unit 234 can execute the second software 242, or a combination thereof to generate multiple instances of the transformation matrix 810.

The multiscreen module 1214 can also be implemented as hardware circuitry or hardware accelerators in the first control unit 212, the second control unit 234, or a combination thereof. In addition, the multiscreen module 1214 can also be implemented as hardware circuitry or hardware accelerators in the first device 102, the second device 106, or a combination thereof but outside of the first control unit 212, the second control unit 234, or a combination thereof.

Moreover, the multiscreen module 1214 can also communicate the multiple instances of the transformation matrix 810 to other modules in the control flow 1200 or other devices of the electronic system 100 through the first communication unit 216, the second communication unit 236, or a combination thereof. After generating the multiple instances of the transformation matrix 810, the control flow 1200 of FIG. 12 can pass from the multiscreen module 1214 to the gesture module 1216.

The gesture module 1216 is configured to generate and display the position indicator 816 or the orthographic projection 902 of FIG. 8 on a display interface, such as the first display interface 230 or the second display interface 240. The gesture module 1216 can generate the position indicator 816 or the orthographic projection 902 based on the directive gesture 802 and the transformation matrix 810 generated from the first gesture 314 and the second gesture 318. The gesture module 1216 can include a ray casting module 1218, an orthographic module 1220, or a combination thereof.

The ray casting module 1218 is configured to generate the position indicator 816 based on the ray casting vector 804 of FIG. 8 generated from the directive gesture 802. The ray casting module 1218 can generate the position indicator 816 when the user 302 points the directive gesture 802 at a display interface such as the first display interface 230 or the second display interface 240. The ray casting module 1218 can generate the position indicator 816 based on the intersection 336 of the ray casting vector 804 and the display plane 818 of FIG. 8 in the display coordinate system 332.

As an example, the ray casting module 1218 can generate the position indicator 816 by first capturing the directive gesture 802 of the user 302. The ray casting module 1218 can capture the directive gesture 802 using the first device 102 such as the sensor 103.

The directive gesture 802 can be a gesticulation made by an appendage of the user 302, such as a finger, a hand, an arm, or a combination thereof, in the direction of the display interface. As an example, the directive gesture 802 can be the pointing gesture 308 of FIG. 3. The ray casting module 1218 can use the first device 102 to capture points or positions on the appendage of the user 302 making the directive gesture 802.

As an example, the ray casting module 1218 can capture the directive gesture 802 by determining the coordinates 324 of the first appendage position 806 of FIG. 8 and the second appendage position 808 of FIG. 8 on the appendage of the user 302 making the directive gesture 802. As a more specific example, the ray casting module 1218 can determine the coordinates 324 of the first appendage position 806 and the second appendage position 808 by capturing the coordinates 324 of the first appendage position 806 and the second appendage position 808, respectively, in the sensor coordinate system 334. As an even more specific example, the ray casting module 1218 can use a depth sensor, a stereographic camera, or a combination thereof to capture the coordinates 324 of the first appendage position 806 and the second appendage position 808 in the sensor coordinate system 334.

The ray casting module 1218 can store the coordinates 324 of the first appendage position 806 and the second appendage position 808 in the first storage unit 214, the second storage unit 246, or a combination thereof. The ray casting module 1218 can then apply the transformation matrix 810 to the coordinates 324 of the first appendage position 806 and the second appendage position 808. The ray casting module 1218 can apply the transformation matrix 810 to the first appendage position 806 and the second appendage position 808 for transforming the coordinates 324 captured in the sensor coordinate system 334 into the display coordinate system 332.

As an example, the ray casting module 1218 can calculate the transformed first point 812 of FIG. 8 by multiplying the transformation matrix 810 with the coordinates 324 of the first appendage position 806. The resulting instance of the transformed first point 812 can be a set of coordinates in the display coordinate system 332.

As another example, the ray casting module 1218 can calculate the transformed second point 814 of FIG. 8 by multiplying the transformation matrix 810 with the coordinates 324 of the first appendage position 806. The resulting instance of the transformed second point 814 can also be a set of coordinates in the display coordinate system 332. The ray casting module 1218 can use the first control unit 212, the second control unit 234, or a combination thereof to calculate the transformed first point 812 and the transformed second point 814.

The ray casting module 1218 can generate the ray casting vector 804 by connecting a vector using the transformed first point 812 and the transformed second point 814. As an example, the ray casting module 1218 can use the transformed first point 812 as an origination point of the ray casting vector 804 and can use the transformed second point 814 as a directional point of the ray casting vector 804.

The ray casting module 1218 can extend the length of the ray casting vector 804 toward the display interface such as the first display interface 230 or the second display interface 240. The ray casting module 1218 can generate the position indicator 816 based on the intersection 336 of the ray casting vector 804 and the display plane 818. The display plane 818 can be a coordinate plane in the display coordinate system 332. As an example, the display plane 818 can be a coordinate plane comprised of a horizontal axis, such as the U-axis, and a vertical axis, such as the V-axis, in the display coordinate system 332. As a more specific example, the display plane 818 can correspond to a surface of the first display interface 230 or the second display interface 240 including a display surface.

The ray casting module 1218 can generate the position indicator 816 by calculating the coordinates 324 of the intersection 336 between the ray casting vector 804 and the display plane 818. As an example, the ray casting module 1218 can generate the position indicator 816 by calculating the coordinates 324 of the intersection point 338 when the ray casting vector 804 intersects the display plane 818. The ray casting vector 804 can use the display interface, such as the first display interface 230 or the second display interface 240, to display the position indicator 816 at the intersection point 338.

As an example, the user 302 can remotely control a display interface, such as the first display interface 230 or the second display interface 240, using the directive gesture 802. As a more specific example, the user 302 can place the position indicator 816 over a hyperlink, a menu option, a selection button, or a combination thereof to control an interface page or graphic associated with the display interface. In this example, the user 302 can also select or active the online link, the menu option, the selection button, or a combination thereof by pointing the directive gesture 802 at the position indicator 816 a second time. Based on this example, the position indicator 816 can serve the same function as a mouse pointer or a touchpad pointer.

As another example, the directive gesture 802 can be the typing gesture 1002 of FIG. 10 and the position indicator 816 can be generated over the keyboard key 1004 of FIG. 10. In this example, the keyboard key 1004 can be a character key, symbolic key, or a numeric key included as part of a keyboard graphic displayed on the display interface. As a more specific example, the keyboard graphic can be of a QWERTY-type keyboard displayed on the second display interface 240. Also, in this example, the typing gesture 1002 can involve the user 302 pointing one or more fingertips at the display interface.

Continuing with the example, the ray casting module 1218 can use one or more instances of the sensor 103 to capture the coordinates 324 of the typing gesture 1002 in the sensor coordinate system 334. As a more specific example, the ray casting module 1218 can use the sensor 103 to capture the coordinates 324 of the first appendage position 806 and the second appendage position 808 of the typing gesture 1002. The ray casting module 1218 can capture the coordinates 324 when the electronic system 100 displays the keyboard graphic on the display interface such as the first display interface 230, the second display interface 240, or a combination thereof.

The ray casting module 1218 can use the first control unit 212, the second control unit 234, or a combination thereof to calculate the transformed first point 812 by multiplying the coordinates 324 of the first appendage position 806 by the transformation matrix 810. In addition, the ray casting module 1218 can also use the first control unit 212, the second control unit 234, or a combination thereof to calculate the transformed second point 814 by multiplying the coordinates 324 of the second appendage position 808 by the transformation matrix 810.

The ray casting module 1218 can then generate the ray casting vector 804 by connecting a vector using the transformed first point 812 and the transformed second point 814 of the typing gesture 1002. The ray casting module 1218 can generate the position indicator 816 over the keyboard key 1004 displayed at the intersection 336 of the ray casting vector 804 and the display plane 818. For example, the user 302 can type the character "Y" by pointing an index finger at the "Y" key displayed on the display interface.

As an additional example, the ray casting module 1218 can use multiple instances of the sensor 103 to capture multiple instances of the typing gesture 1002, the directive gesture 802, or a combination thereof. In addition, the ray casting module 1218 can pass the control flow 1200 back to the calibrating module 1202 to calibrate a specific instance of the typing gesture 1002 associated with each key of the keyboard.

The orthographic module 1220 is configured to generate the orthographic projection 902 of FIG. 9 on the display interface. As an example, the orthographic module 1220 can generate the orthographic projection 902 of the directive gesture 802 on the display interface in the display coordinate system 332.

The orthographic module 1220 can generate the orthographic projection 902 by first determining the reference point 904 of FIG. 9 of the directive gesture 802 in the sensor coordinate system 334. The orthographic module 1220 can determine the reference point 904 of the directive gesture 802 by capturing the coordinates 324 of the reference point 904 in the sensor coordinate system 334. As an example, the orthographic module 1220 can use the sensor 103 to capture the coordinates 324 of the reference point 904 in the sensor coordinate system 334.

As previously discussed, the reference point 904 can represent an area or locus on an appendage of the user 302. As an example, the reference point 904 can include a fingertip, a joint, or a protrusion on the appendage of the user 302 making the directive gesture 802. The orthographic module 1220 can store the coordinates 324 of the reference point 904 in the first storage unit 214, the second storage unit 246, or a combination thereof.

The orthographic module 1220 can then apply the transformation matrix 810 to the coordinates 324 of the reference point 904. The orthographic module 1220 can apply the transformation matrix 810 to the reference point 904 for transforming the coordinates 324 of the reference point 904 captured in the sensor coordinate system 334 into the display coordinate system 332.

As an example, the orthographic module 1220 can calculate the transformed referencing point 906 of FIG. 9 by multiplying the transformation matrix 810 with the coordinates 324 of the reference point 904. The resulting instance of the transformed referencing point 906 can be a set of coordinates in the display coordinate system 332. The orthographic module 1220 can use the first control unit 212, the second control unit 234, or a combination thereof to calculate the transformed referencing point 906.

The orthographic module 1220 can generate the orthographic projection 902 by displaying a projection or image of the directive gesture 802 on the display interface in the display coordinate system 332. The orthographic module 1220 can generate the orthographic projection 902 at the transformed referencing point 906 by displaying the transformed referencing point 906 on the display interface. The orthographic module 1220 can generate the transformed referencing point 906 on the display interface by using both a horizontal coordinate, such as the U-coordinate, and a vertical coordinate, such as the V-coordinate, of the transformed referencing point 906 and discarding a depth coordinate, such as the T-coordinate, of the transformed referencing point 906.

As an example, the orthographic module 1220 can capture multiple instances of the reference point 904 used to outline a contour of the directive gesture 802. As a more specific example, the directive gesture 802 can be an open palm gesture and the orthographic module 1220 can capture multiple instances of the reference point 904 outlining the contour of the open palm gesture. The orthographic module 1220 can then use the transformation matrix 810 to calculate multiple instances of the transformed referencing point 906 in the display coordinate system 332.

In this example, the arrangement of the multiple instances of the transformed referencing point 906 can be in the shape of the open palm gesture. The orthographic module 1220 can then generate the orthographic projection 902 of the directive gesture 802 by displaying the multiple instances of the transformed referencing point 906 on the display interface.

The gesture module 1216 can be part of the first software 226, the second software 242, or a combination thereof. The first control unit 212 can execute the first software 226, the second control unit 234 can execute the second software 242, or a combination thereof to generate the position indicator 816 or the orthographic projection 902.

The gesture module 1216 can also be implemented as hardware circuitry or hardware accelerators in the first control unit 212, the second control unit 234, or a combination thereof. In addition, the gesture module 1216 can also be implemented as hardware circuitry or hardware accelerators in the first device 102, the second device 106, or a combination thereof but outside of the first control unit 212, the second control unit 234, or a combination thereof.

Moreover, the gesture module 1216 can also communicate the position indicator 816 or the orthographic projection 902 to other modules in the control flow 1200 or other devices of the electronic system 100 through the first communication unit 216, the second communication unit 236, or a combination thereof. After generating and displaying the position indicator 816, the control flow 1200 of FIG. 12 can pass from the gesture module 1216 to the recalibration module 1222.

The recalibration module 1222 is configured to recalibrate the electronic system 100 by requiring the user 302 to recalibrate one or more gestures directed at a display interface such as the first display interface 230 or the second display interface 240. The recalibration module 1222 can recalibrate the electronic system 100 when the recalibration module 1222 detects a change in the orientation or location of a device, such as the first device 102, the second device 106, or a combination thereof.

As an example, the sensor 103 can be a standalone sensor and the recalibration module 1222 can recalibrate the electronic system 100 when the sensor 103 is moved from one location to another. As another example, the recalibration module 1222 can recalibrate the electronic system 100 when the user 302 changes a tilt or height of the second display interface 240.

The recalibration module 1222 can recalibrate the electronic system 100 by passing the control flow 1200 back to the calibrating module 1202. The recalibration module 1222 can pass the control flow 1200 back to the calibrating module 1202 to display additional instances of the calibration point 306. In addition, the recalibration module 1222 can pass the control flow 1200 back to the calibrating module 1202 to capture new instances of the first gesture 314 and the second gesture 318.

Moreover, the recalibration module 1222 can instruct the user 302 to stand at new instances of the first position 316, the second position 320, or a combination thereof. The recalibration module 1222 can also guide the user 302 to new instances of the first position 316, the second position 320, or a combination thereof. The recalibration module 1222 can guide the user 302 by generating the recalibration notification 1102 of FIG. 11. The recalibration notification 1102 can include audio communications, text messages, visual cues, or a combination thereof. As an example, the recalibration module 1222 can generate the recalibration notification 1102 as a popup window containing new instructions for the user 302.

The recalibration module 1222 can also pass the control flow 1200 back to the matrix module 1210 to retrieve a new instance of the transformation matrix 810 or generate a new instance of the transformation matrix 810 based on new gesture coordinates captured by the sensor 103. As an example, the recalibration module 1222 can pass the control flow 1200 back to the matrix module 1210 to retrieve a new instance of the transformation matrix 810 when the user 302 is pointing to one of the display regions 604 near a boundary or corner of the display interface.

In this example, the recalibration module 1222 can also pass the control flow 1200 back to the calibrating module 1202 to divide up the display interface into two or more of the display regions 604. The calibrating module 1202 can then display new instances of the calibration point 306 in each of the display regions 604 and capture new gesture coordinates for each of the display regions 604. Based on this example, the matrix module 1210 can generate new instances of the transformation matrix 810 to appropriately capture the different regions of the display interface.

The recalibration module 1222 can be part of the first software 226, the second software 242, or a combination thereof. The first control unit 212 can execute the first software 226, the second control unit 234 can execute the second software 242, or a combination thereof to recalibrate the electronic system 100. Moreover, the recalibration module 1222 can also communicate the new instances of the transformation matrix 810 to other modules in the control flow 1200 or other devices of the electronic system 100 through the first communication unit 216, the second communication unit 236, or a combination thereof.

The recalibration module 1222 can also be implemented as hardware circuitry or hardware accelerators in the first control unit 212, the second control unit 234, or a combination thereof. In addition, the recalibration module 1222 can also be implemented as hardware circuitry or hardware accelerators in the first device 102, the second device 106, or a combination thereof but outside of the first control unit 212, the second control unit 234, or a combination thereof.

Figure 13:
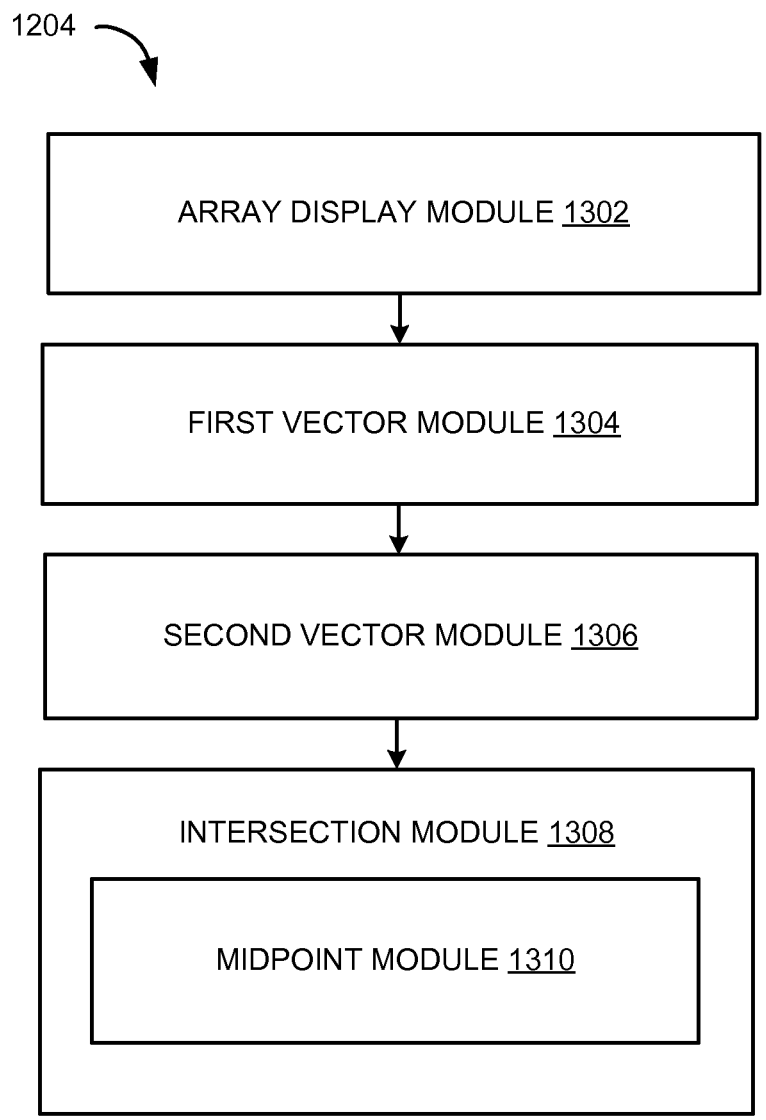
FIG. 13 is a detailed view of a vector calibration module of the control flow of the electronic system.

Referring now to FIG. 13, therein is shown a detailed view of the vector calibration module 1204 of the control flow 1200 of FIG. 12. The vector calibration module 1204 can include an array display module 1302, a first vector module 1304, a second vector module 1306, an intersection module 1308, or a combination thereof.

The array display module 1302 is configured to display the array 310 of FIG. 3 of multiple instances of the calibration point 306 of FIG. 3. As an example, the array display module 1302 can use a display interface such as the second display interface 240 of FIG. 2 to display the array 310 of multiple instances of the calibration point 306. As a more specific example, the array display module 1302 can use a networked-enabled television representing the second display interface 240 to display the array 310.

The array display module 1302 can determine a size of the array 310 based on a dimension of the display interface. The size of the array 310 can represent the number of instances of the calibration point 306 included in the array 310. As an example, the array display module 1302 can increase the size of the array 310 based on the dimension of the display interface. As another example, the array display module 1302 can increase the size of the array 310 based on a resolution of the display interface, such as the second display interface 240.

The array display module 1302 can display the array 310 of multiple instances of the calibration point 306 in the display coordinate system 332 of FIG. 3. The array display module 1302 can establish an origin of the display coordinate system 332. As an example, the array display module 1302 can establish the origin at a corner of the display interface, such as the second display interface 240. As another example, the array display module 1302 can establish the origin at a center of the display interface.

The array display module 1302 can also record the coordinates 324 of FIG. 3 of the calibration point 306 displayed on the display interface. As an example, the display coordinate system 332 can be a three-dimensional coordinate system with a U-axis, a V-axis, and a T-axis. In this three-dimensional coordinate system, the U-axis can run along a horizontal width of the display interface, the V-axis can run along a vertical height of the display interface, and the T-axis can represent a depth axis directed into the display interface.

As an example, the array display module 1302 can use the second display interface 240 to display the array 310 as two rows of three points. In this example, the array display module 1302 can record the coordinates 324 of each instance of the calibration point 306 in the array 310 of six. As a more specific example, the array display module 1302 can record the coordinates 324 of one instance of the calibration point 306 in the array 310 as (U1, V1, 0) and another instance of the calibration point 306 in the array 310 as (U2, V2, 0). In this example, the T-coordinates for both points remain at 0 when the second display interface 240 is a two-dimensional display.

The array display module 1302 can also communicate the instruction 312 of FIG. 3 to the user 302 of FIG. 3. The instruction 312 can direct the user 302 to point at one instance of the calibration point 306 in the array 310 from two different positions including the first position 316 of FIG. 3 and the second position 320 of FIG. 3. The array display module 1302 can also record the coordinates 324 of this instance of the calibration point 306 in the display coordinate system 332.

As an example, the array display module 1302 can communicate the instruction 312 as a popup window on the first display interface 230, the second display interface 240, or a combination thereof. As another example, the array display module 1302 can communicate the instruction 312 as an audio cue delivered using the first user interface 218 of FIG. 2, the second user interface 238 of FIG. 2, or a combination thereof.

The array display module 1302 can be part of the first software 226 of FIG. 2, the second software 242 of FIG. 2, or a combination thereof. The first control unit 212 of FIG. 2 can execute the first software 226, the second control unit 234 of FIG. 2 can execute the second software 242, or a combination thereof to display the array 310 of multiple instances of the calibration point 306 and record the coordinates 324 of the calibration point 306.

The array display module 1302 can also be implemented as hardware circuitry or hardware accelerators in the first control unit 212, the second control unit 234, or a combination thereof. In addition, the array display module 1302 can also be implemented as hardware circuitry or hardware accelerators in the first device 102, the second device 106, or a combination thereof but outside of the first control unit 212, the second control unit 234, or a combination thereof.

Moreover, the array display module 1302 can also communicate the coordinates 324 of the calibration point 306 to other modules in the control flow 1200 or other devices of the electronic system 100 through the first communication unit 216 of FIG. 2, the second communication unit 236 of FIG. 2, or a combination thereof. After displaying the array 310 and recording the coordinates 324 of the calibration point 306, the control flow 1200 of FIG. 12 can pass from the array display module 1302 to the first vector module 1304.

The first vector module 1304 is configured to generate the first calibration vector 322 of FIG. 3. The first vector module 1304 can generate the first calibration vector 322 when the user 302 responds to the instruction 312 to point at one instance of the calibration point 306 displayed on a display interface from the first position 316. The first vector module 1304 can generate the first calibration vector 322 by using the first device 102 of FIG. 1, such as the sensor 103 of FIG. 1, to capture the coordinates 324 of the initial point 326 of FIG. 3 and the secondary point 328 of FIG. 3 in the sensor coordinate system 334 of FIG. 3. The first vector module 1304 can capture the coordinates 324 of the initial point 326 and the secondary point 328 by using the first device 102 to capture the coordinates 324 of one or more anatomical joints or appendage points used to make the first gesture 314 of FIG. 3.

As an example, the first gesture 314 can be the pointing gesture 308 of FIG. 3. In this example, the first vector module 1304 can generate the first calibration vector 322 by using the sensor 103 to capture the coordinates 324 of the initial point 326 and the secondary point 328 on an index finger of the user 302 used to make the pointing gesture 308. Continuing with this example, the first vector module 1304 can use the sensor 103 to capture the coordinates 324 of the distal inter-phalangeal joint as the initial point 326 and the coordinates 324 of the fingertip as the secondary point 328. The first vector module 1304 can capture the coordinates 324 of the distal inter-phalangeal joint and the fingertip in the sensor coordinate system 334.

As another example, the first gesture 314 can involve the user 302 making a gun gesture at the second display interface 240 using an index finger and a thumb. In this example, the first vector module 1304 can generate the first calibration vector 322 by using the sensor 103 to capture the coordinates 324 of the tip of the thumb as the initial point 326 and the coordinates 324 of the tip of the index finger as the secondary point 328.

As an example, the first vector module 1304 can use the first image capture unit 231 to capture the coordinates 324 of the one or more anatomical joints or appendage points in the sensor coordinate system 334. As a more specific example, the first vector module 1304 can use a depth sensor representing the first image capture unit 231 to capture the coordinates 324 of the one or more joints or appendage points. As another example, the first vector module 1304 can use a 2D camera and a computer vision algorithm to determine the coordinates 324 of the one or more joints or appendage points.

As an example, the first device 102 can be a television with sensors embedded in the television. In this example, the first vector module 1304 can use one or more depth sensors or RGB sensors embedded in the first image capture unit 231 of the television to capture the coordinates 324 of the initial point 326 and the secondary point 328 and generate the first calibration vector 322 in the sensor coordinate system 334. In this example, the first image capture unit 231 can capture the first gesture 314 without capturing the calibration point 306 displayed by the first display interface 230.

As another example, the first device 102 can be a stand-alone sensor such as the sensor 103. In this example, the first vector module 1304 can use the first image capture unit 231 of the sensor 103 to capture the coordinates 324 of the initial point 326 and the secondary point 328 and generate the first calibration vector 322 in the sensor coordinate system 334. Based on this example, the sensor 103 can either capture the first gesture 314 without capturing the display interface or capture both the first gesture 314 and the display interface displaying the calibration point 306 depending on the placement of the sensor 103.

The first vector module 1304 can extend the length of the first calibration vector 322 toward the display interface such as the first display interface 230 or the second display interface 240. As an example, the first vector module 1304 can extend the length of the first calibration vector 322 by plotting point along the trajectory of the first calibration vector 322 in the sensor coordinate system 334. The first vector module 1304 can use a computer vision algorithm to extend the length of the first calibration vector 322. The first vector module 1304 can extend the length of the first calibration vector 322 until the first calibration vector 322 intersects the display interface such as the first display interface 230 or the second display interface 240.

The first vector module 1304 can be part of the first software 226, the second software 242, or a combination thereof. The first control unit 212 can execute the first software 226, the second control unit 234 can execute the second software 242, or a combination thereof to generate the first calibration vector 322.

The first vector module 1304 can also be implemented as hardware circuitry or hardware accelerators in the first control unit 212, the second control unit 234, or a combination thereof. In addition, the first vector module 1304 can also be implemented as hardware circuitry or hardware accelerators in the first device 102, the second device 106, or a combination thereof but outside of the first control unit 212, the second control unit 234, or a combination thereof.

Moreover, the first vector module 1304 can also communicate the first calibration vector 322 to other modules in the control flow 1200 or other devices of the electronic system 100 through the first communication unit 216, the second communication unit 236, or a combination thereof. After generating the first calibration vector 322, the control flow 1200 can pass from the array display module 1302 to the first vector module 1304.

The second vector module 1306 is configured to generate the second calibration vector 330 of FIG. 3. The second vector module 1306 can generate the second calibration vector 330 when the user 302 responds to the instruction 312 to point at the same instance of the calibration point 306 displayed on the display interface from the second position 320. The second vector module 1306 can generate the second calibration vector 330 by using the first device 102, such as the sensor 103, to capture the coordinates 324 of the initial point 326 and the secondary point 328 in the sensor coordinate system 334.

The second vector module 1306 can capture the coordinates 324 of the initial point 326 and the secondary point 328 by using the first device 102 to capture the coordinates 324 of one or more anatomical joints or appendage points used to make the second gesture 318 of FIG. 3. As previously discussed, the geographic position of the second position 320 can be different from the geographic position of the first position 316. As an example, the first position 316 can be in one corner of a living room and the second position 320 can be in another corner of the same living room. As another example, the second position 320 can be separated from the first position 316 by a set distance predetermined by the electronic system 100 of FIG. 1.

As an example, the second gesture 318 can also be the pointing gesture 308. In this example, the second vector module 1306 can generate the second calibration vector 330 by using the sensor 103 to capture the coordinates 324 of the initial point 326 and the secondary point 328 on an index finger of the user 302 used to make the pointing gesture 308. Continuing with this example, the second vector module 1306 can use the sensor 103 to capture the coordinates 324 of the distal inter-phalangeal joint as the initial point 326 and the coordinates 324 of the fingertip as the secondary point 328. The second vector module 1306 can capture the coordinates 324 of the distal inter-phalangeal joint and the fingertip in the sensor coordinate system 334.

As an example, the second vector module 1306 can use the first image capture unit 231 to capture the coordinates 324 of the one or more anatomical joints or appendage points in the sensor coordinate system 334. As a more specific example, the second vector module 1306 can use a depth sensor representing the first image capture unit 231 to capture the coordinates 324 of the one or more joints or appendage points.

The second vector module 1306 can extend the length of the second calibration vector 330 toward the display interface such as the first display interface 230 or the second display interface 240. As an example, the second vector module 1306 can extend the length of the second calibration vector 330 by plotting point along the trajectory of the second calibration vector 330 in the sensor coordinate system 334. The second vector module 1306 can use a computer vision algorithm to extend the length of the second calibration vector 330. The second vector module 1306 can extend the length of the second calibration vector 330 until the second calibration vector 330 intersects the display interface such as the first display interface 230 or the second display interface 240.

The second vector module 1306 can be part of the first software 226, the second software 242, or a combination thereof. The first control unit 212 can execute the first software 226, the second control unit 234 can execute the second software 242, or a combination thereof to generate the second calibration vector 330.

The second vector module 1306 can also be implemented as hardware circuitry or hardware accelerators in the first control unit 212, the second control unit 234, or a combination thereof. In addition, the second vector module 1306 can also be implemented as hardware circuitry or hardware accelerators in the first device 102, the second device 106, or a combination thereof but outside of the first control unit 212, the second control unit 234, or a combination thereof.

Moreover, the second vector module 1306 can also communicate the second calibration vector 330 to other modules in the control flow 1200 or other devices of the electronic system 100 through the first communication unit 216, the second communication unit 236, or a combination thereof. After generating the second calibration vector 330, the control flow 1200 can pass from the second vector module 1306 to the intersection module 1308.

The intersection module 1308 is configured to determine the intersection 336 of FIG. 3 of the first calibration vector 322 and the second calibration vector 330. The intersection module 1308 can determine the intersection 336 in the sensor coordinate system 334.

As an example, the intersection module 1308 can determine the intersection 336 by using the first control unit 212, the second control unit 234, or a combination thereof to calculate the coordinates 324 of the intersection point 338 of FIG. 3 of the first calibration vector 322 and the second calibration vector 330. The intersection module 1308 can calculate the intersection point 338 in the sensor coordinate system 334. As a more specific example, the intersection module 1308 can use the first control unit 212, the second control unit 234, or a combination thereof to calculate the coordinates 324 of the intersection point 338 in the sensor coordinate system 334. In this example, the first calibration vector 322 and the second calibration vector 330 are non-parallel vectors capable of intersecting at an actual point in the sensor coordinate system 334.

The intersection module 1308 can also include a midpoint module 1310. The midpoint module 1310 is configured to determine the midpoint 342 of FIG. 3 of the perpendicular intersecting segment 340 of FIG. 3. As previously, discussed, the perpendicular intersecting segment 340 can intersect both the first calibration vector 322 and the second calibration vector 330. The perpendicular intersecting segment 340 can also be the shortest line segment separating the first calibration vector 322 and the second calibration vector 330. The midpoint module 1310 can determine the midpoint 342 of the perpendicular intersecting segment 340 when the first calibration vector 322 and the second calibration vector 330 do not intersect at an actual point in the sensor coordinate system 334.

The midpoint module 1310 can use the first control unit 212, the second control unit 234, or a combination thereof to calculate the coordinates 324 of the midpoint 342 in the sensor coordinate system 334. As an example, the midpoint module 1310 can use a computer vision algorithm, an affine structure estimation, or a combination thereof to calculate the coordinates 324 of the midpoint 342. The intersection module 1308 can use the coordinates 324 of the midpoint 342 to represent the intersection 336 when the first calibration vector 322 and the second calibration vector 330 do not intersect at an actual point.

The intersection module 1308, including the midpoint module 1310, can be part of the first software 226, the second software 242, or a combination thereof. The first control unit 212 can execute the first software 226, the second control unit 234 can execute the second software 242, or a combination thereof to determine the intersection 336.

The intersection module 1308 can also be implemented as hardware circuitry or hardware accelerators in the first control unit 212, the second control unit 234, or a combination thereof. In addition, the intersection module 1308 can also be implemented as hardware circuitry or hardware accelerators in the first device 102, the second device 106, or a combination thereof but outside of the first control unit 212, the second control unit 234, or a combination thereof. Moreover, the intersection module 1308 can also communicate the intersection 336 to other modules in the control flow 1200 or other devices of the electronic system 100 through the first communication unit 216, the second communication unit 236, or a combination thereof.

Figure 14:
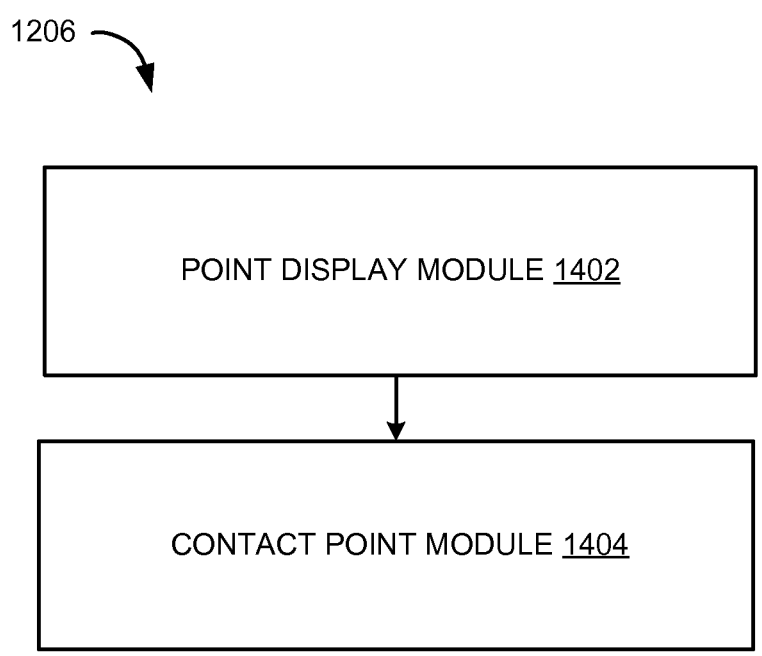
FIG. 14 is a detailed view of a contact calibration module of the control flow of the electronic system.

Referring now to FIG. 14, therein is shown a detailed view of the contact calibration module 1206 of the control flow 1200 of FIG. 12. The contact calibration module 1206 can include a point display module 1402, a contact point module 1404, or a combination thereof.

The point display module 1402 is configured to display the array 310 of FIG. 3 of multiple instances of the calibration point 306 of FIG. 3. As an example, the point display module 1402 can use a display interface such as the second display interface 240 of FIG. 2 to display the array 310 of multiple instances of the calibration point 306.

The point display module 1402 can determine a size of the array 310 based on a dimension of the display interface. The size of the array 310 can represent the number of instances of the calibration point 306 included in the array 310. As an example, the point display module 1402 can increase the size of the array 310 based on the dimension of the display interface. As another example, the point display module 1402 can increase the size of the array 310 based on a resolution of the display interface, such as the second display interface 240.

The point display module 1402 can display the array 310 in the display coordinate system 332 of FIG. 3. The point display module 1402 can also record the coordinates 324 of FIG. 3 of the calibration point 306 displayed on the display interface.

The point display module 1402 can also communicate the instruction 312 of FIG. 3 to the user 302 of FIG. 3. As an example, the instruction 312 can direct the user 302 to touch one instance of the calibration point 306 in the array 310. The point display module 1402 can record the coordinates 324 of this instance of the calibration point 306 in the display coordinate system 332.

The point display module 1402 can be part of the first software 226 of FIG. 2, the second software 242 of FIG. 2, or a combination thereof. The first control unit 212 of FIG. 2 can execute the first software 226, the second control unit 234 of FIG. 2 can execute the second software 242, or a combination thereof to display the array 310 of multiple instances of the calibration point 306 and record the coordinates 324 of the calibration point 306.

The point display module 1402 can also be implemented as hardware circuitry or hardware accelerators in the first control unit 212, the second control unit 234, or a combination thereof. In addition, the point display module 1402 can also be implemented as hardware circuitry or hardware accelerators in the first device 102, the second device 106, or a combination thereof but outside of the first control unit 212, the second control unit 234, or a combination thereof.

Moreover, the point display module 1402 can also communicate the coordinates 324 of the calibration point 306 to other modules in the control flow 1200 or other devices of the electronic system 100 through the first communication unit 216 of FIG. 2, the second communication unit 236 of FIG. 2, or a combination thereof. After displaying the array 310 and recording the coordinates 324 of the calibration point 306, the control flow 1200 of FIG. 12 can pass from the point display module 1402 to the contact point module 1404.

The contact point module 1404 is configured to capture the contact point 402 of FIG. 4 made by the calibration gesture 304 of FIG. 4 coming into contact with a display interface, such as the first display interface 230 or the second display interface 240. The contact point module 1404 can capture the contact point 402 when the user 302 responds to the instruction 312 to touch one instance of the calibration point 306 displayed on the display interface. The contact point module 1404 can capture the contact point 402 by using the first device 102 of FIG. 1, such as the sensor 103 of FIG. 1, to capture the coordinates 324 of FIG. 3 of the contact point 402 in the sensor coordinate system 334 of FIG. 3.

As an example, the calibration gesture 304 can involve the user 302 applying a single finger to a display interface such as the first display interface 230 or the second display interface 240. The contact point module 1404 can capture the contact point 402 by capturing the coordinates 324 of the fingertip of the user 302 when the user 302 makes contact with the display interface.

As an example, the contact point module 1404 can use the first image capture unit 231 to capture the coordinates 324 of the contact point 402 in the sensor coordinate system 334. As a more specific example, the contact point module 1404 can use a depth sensor representing the first image capture unit 231 to capture the coordinates 324 of the contact point 402. As another example, the contact point module 1404 can use a 2D camera and a computer vision algorithm to determine the coordinates 324 of the contact point 402.

In these examples, the first device 102 can be a standalone sensor such as the sensor 103. Also, for example, the sensor 103 can be placed behind the user 302 where a field-of-view of the sensor 103 faces a display interface such as the second display interface 240. As another example, the sensor 103 can be positioned above the user 302 where the field-of-view of the sensor 103 faces a display interface such as the second display interface 240.

The contact point module 1404 can be part of the first software 226, the second software 242, or a combination thereof. The first control unit 212 can execute the first software 226, the second control unit 234 can execute the second software 242, or a combination thereof to capture the contact point 402.

The contact point module 1404 can also be implemented as hardware circuitry or hardware accelerators in the first control unit 212, the second control unit 234, or a combination thereof. In addition, the contact point module 1404 can also be implemented as hardware circuitry or hardware accelerators in the first device 102, the second device 106, or a combination thereof but outside of the first control unit 212, the second control unit 234, or a combination thereof. Moreover, the contact point module 1404 can also communicate the coordinates 324 of the contact point 402 to other modules in the control flow 1200 or other devices of the electronic system 100 through the first communication unit 216, the second communication unit 236, or a combination thereof.

Figure 15:
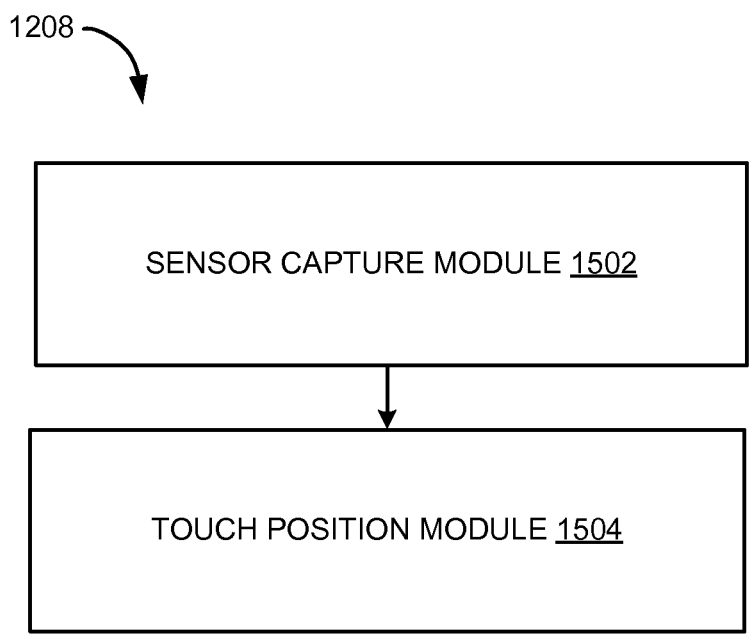
FIG. 15 is a detailed view of a touchscreen calibration module of the control flow of the electronic system.

Referring now to FIG. 15, therein is shown a detailed view of the touchscreen calibration module 1208 of the control flow 1200 of FIG. 12. The touchscreen calibration module 1208 can include a sensor capture module 1502, a touch position module 1504, or a combination thereof.

The sensor capture module 1502 is configured to capture the contact point 402 of FIG. 4 made by the calibration gesture 304 of FIG. 4 coming into contact with the touchscreen 502 of FIG. 5. As previously discussed, the touchscreen 502 can be an instance of the first display interface 230 or the second display interface 240 with a capacitive or resistive touch capability.

The sensor capture module 1502 can capture the contact point 402 when the user 302 of FIG. 3 touches an arbitrary position or point on the touchscreen 502. The sensor capture module 1502 can capture the contact point 402 by using the first device 102 of FIG. 1, such as the sensor 103 of FIG. 1, to capture the coordinates 324 of FIG. 3 of the contact point 402 in the sensor coordinate system 334 of FIG. 3.

As an example, the calibration gesture 304 can involve the user 302 applying a single finger to the touchscreen 502. The sensor capture module 1502 can capture the contact point 402 by capturing the coordinates 324 of the fingertip of the user 302 when the user 302 makes contact with the touchscreen 502.

As an example, the sensor capture module 1502 can use the first image capture unit 231 to capture the coordinates 324 of the contact point 402 in the sensor coordinate system 334. As a more specific example, the sensor capture module 1502 can use a depth sensor representing the first image capture unit 231 to capture the coordinates 324 of the contact point 402. As another example, the sensor capture module 1502 can use a 2D camera and a computer vision algorithm to determine the coordinates 324 of the contact point 402.

As an even more specific example, the sensor capture module 1502 can use the first image capture unit 231 to capture multiple frames or images of the calibration gesture 304 to determine the coordinates 324 of the contact point 402. As a further example, the sensor capture module 1502 can use the first image capture unit 231 to capture 10 frames or images of the calibration gesture 304 as the user 302 touches the touchscreen 502. In this example, the sensor capture module 1502 can use the first control unit 212, the second control unit 234, or a combination thereof to average the coordinates 324 from such frames to determine an average instance of the coordinates 324 of the contact point 402.

In these examples, the first device 102 can be a standalone sensor such as the sensor 103. Also, for example, the sensor 103 can be placed behind the user 302 where a field-of-view of the sensor 103 faces the touchscreen 502. As another example, the sensor 103 can be positioned above the user 302 where the field-of-view of the sensor 103 faces the touchscreen 502.

The sensor capture module 1502 can be part of the first software 226 of FIG. 2, the second software 242 of FIG. 2, or a combination thereof. The first control unit 212 of FIG. 2 can execute the first software 226, the second control unit 234 of FIG. 2 can execute the second software 242, or a combination thereof to capture the contact point 402.

The sensor capture module 1502 can also be implemented as hardware circuitry or hardware accelerators in the first control unit 212, the second control unit 234, or a combination thereof. In addition, the sensor capture module 1502 can also be implemented as hardware circuitry or hardware accelerators in the first device 102, the second device 106, or a combination thereof but outside of the first control unit 212, the second control unit 234, or a combination thereof.

Moreover, the sensor capture module 1502 can also communicate the coordinates 324 of the contact point 402 to other modules in the control flow 1200 or other devices of the electronic system 100 through the first communication unit 216 of FIG. 2, the second communication unit 236 of FIG. 2, or a combination thereof. After capturing the contact point 402, the control flow 1200 of FIG. 12 can pass from the sensor capture module 1502 to the touch position module 1504.

The touch position module 1504 is configured to record the coordinates 324 of the touch position 504 of FIG. 5 in the display coordinate system 332 of FIG. 3. The touch position module 1504 can record the coordinates 324 of the touch position 504 when the user 302 touches an arbitrary position on the touchscreen 502. As previously discussed, the user 302 can touch an arbitrary position on the touchscreen 502 as part of the calibration gesture 304.

As an example, the touch position module 1504 can record the coordinates 324 of the touch position 504 in the display coordinate system 332 after the sensor capture module 1502 captures the contact point 402 in the sensor coordinate system 334. As another example, the touch position module 1504 can record the coordinates 324 of the touch position 504 in the display coordinate system 332 when the sensor capture module 1502 captures the contact point 402 in the sensor coordinate system 334.

The touch position module 1504 can record the coordinates 324 of the touch position 504 based on a signal resulting from the calibration gesture 304 applied to the touchscreen 502. As an example, the touch position module 1504 can record the coordinates 324 of the touch position 504 based on a capacitive signal produced by the user 302 making contact with the touchscreen 502. As a more specific example, the touch position module 1504 can record the coordinates 324 of the touch position 504 when a fingertip of the user 302 touches the touchscreen 502.

The touch position module 1504 can store the coordinates 324 of the touch position 504 in the first storage unit 214, the second storage unit 246, or a combination thereof. The touch position module 1504 can be part of the first software 226, the second software 242, or a combination thereof. The first control unit 212 can execute the first software 226, the second control unit 234 can execute the second software 242, or a combination thereof to record the coordinates 324 of the touch position 504.

The touch position module 1504 can also be implemented as hardware circuitry or hardware accelerators in the first control unit 212, the second control unit 234, or a combination thereof. In addition, the touch position module 1504 can also be implemented as hardware circuitry or hardware accelerators in the first device 102, the second device 106, or a combination thereof but outside of the first control unit 212, the second control unit 234, or a combination thereof. Moreover, the touch position module 1504 can also communicate the coordinates 324 of the touch position 504 to other modules in the control flow 1200 or other devices of the electronic system 100 through the first communication unit 216, the second communication unit 236, or a combination thereof.

It has been discovered that displaying the position indicator 816 of FIG. 8 on a display interface based on the directive gesture 802 of FIG. 8, the first gesture 314 of FIG. 3 directed at the calibration point 306 of FIG. 3, and the second gesture 318 of FIG. 3 directed at the calibration point 306 provides a more accurate method and system for controlling a display interface, such as the second display interface 240, with an appendage of the user 302 from a distance. As an example, the user 302 can employ a hand gesture, such as the pointing gesture 308 of FIG. 3, to change channels on a television, select a link on a computing interface, or undertake a motion in a first-player video game. As a more specific example, the electronic system 100 can generate the position indicator 816 based on the intersection 336 of FIG. 3 of the ray casting vector 804 of FIG. 8 and the display plane 818 of FIG. 8 of the display interface.

It has been discovered that generating the transformation matrix 810 of FIG. 8 based on the calibration point 306 in the display coordinate system 332 and the intersection 336 in the sensor coordinate system 334 improves the accuracy of a gesture control system by aligning the display coordinate system 332 with a physical coordinate system of the user 302 as represented by the sensor coordinate system 334. As an example, the electronic system 100 can transform the coordinates 324 of physical features on the directive gesture 802 of the user 302 into their corollary coordinates in the display coordinate system 332. The electronic system 100 can then use the coordinates 324 of the directive gesture 802 in the display coordinate system 332 to generate the position indicator 816.

It has been discovered that dividing the curved display 602 of FIG. 6 into the display regions 604 of FIG. 6 and generating an instance of the transformation matrix 810 for each of the display regions 604 improves the accuracy of gesture control systems for curved display units. As an example, the electronic system 100 can increase or decrease the size and number of the display regions 604 based on a dimension or curvature of the curved display 602. As a more specific example, the electronic system 100 can also instruct the user 302 to direct the calibration gesture 304 at the curved display 602 from different locations in a room or physical space to ensure that different regions of the curved display 602 can be controlled remotely from different locations in the vicinity of the curved display 602.

It has been discovered that the gesture calibration mechanism provided by the electronic system 100 can be combined with a relative pointing procedure to improve the accuracy of dynamic gestures used to control a display interface. As an example, the user 302 can calibrate an entertainment system, a gaming system, a computing system, or a combination thereof with one or more instances of the calibration gesture 304 from different locations within a room or physical area and use the position indicator 816 as a more accurate starting point for the dynamic gestures captured by one or more sensors using the relative pointing procedure. In this example, the relative pointing procedure can be used to capture the trajectory of a gesture of the user 302 once the electronic system 100 has determined a starting position for the gesture.

Figure 16:
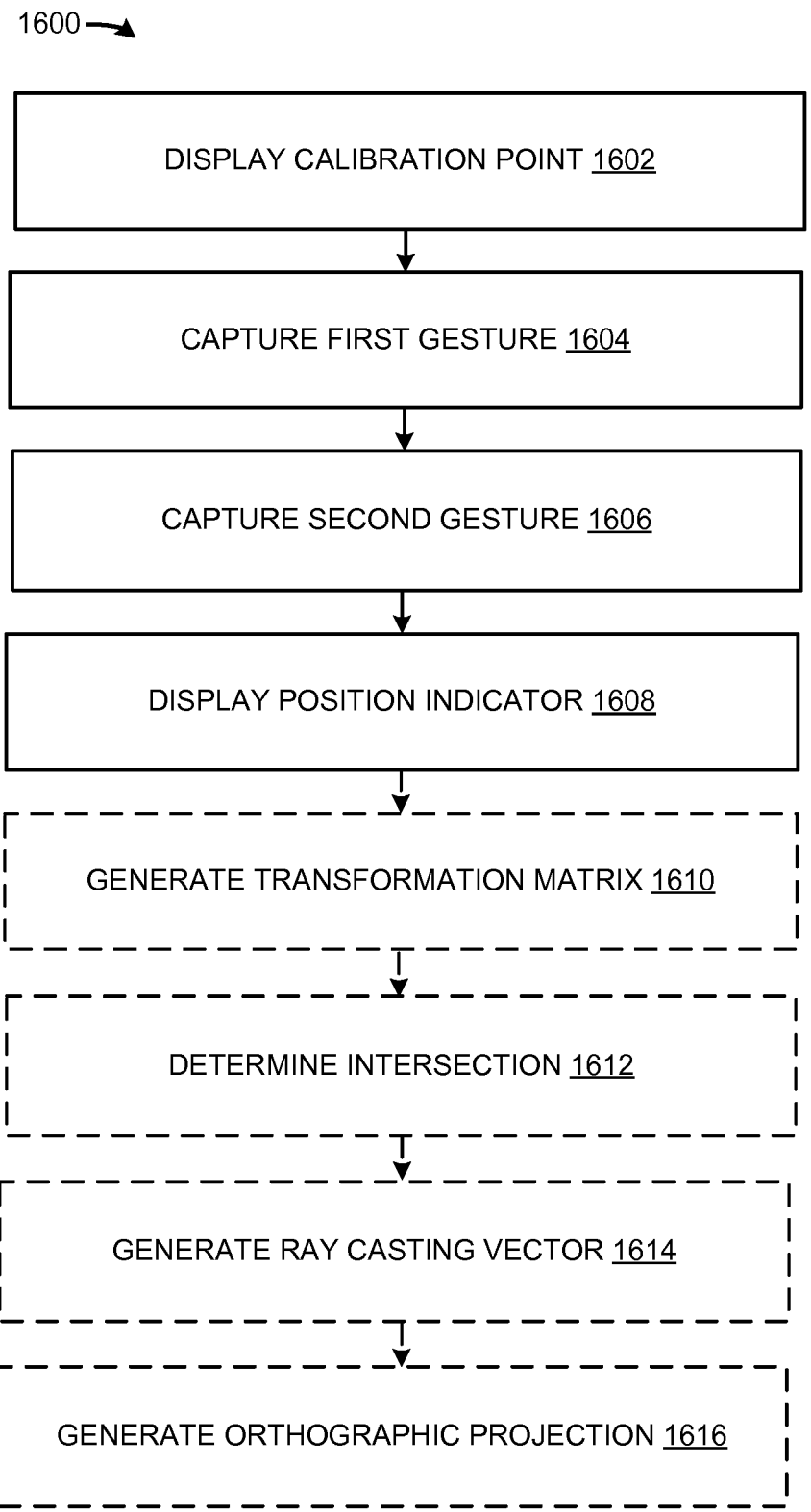
FIG. 16 is a flow chart of a method of operation of the electronic system in a further embodiment of the present invention.

Referring now to FIG. 16, therein is shown an exemplary flow chart of a method 1600 of operation of the electronic system 100 of FIG. 1 in a further embodiment. In one example embodiment, the electronic system 100 can implement the control flow 1200 of FIG. 12.

The method 1600 can include displaying, with the display interface 240 of FIG. 2, the calibration point 306 of FIG. 3 in a block 1602; capturing, with the sensor 103 of FIG. 1 coupled to the display interface 240, the first gesture 314 of FIG. 3 directed at the calibration point 306 from the first position 316 of FIG. 3 in a block 1604; capturing the second gesture 318 of FIG. 3 directed at the calibration point 306 from the second position 320 of FIG. 3 in a block 1606, wherein the second position 320 is different from the first position 316; and displaying, with the control unit 212 of FIG. 2 coupled to the display interface 240, the position indicator 816 of FIG. 8 on the display interface 240 based on the directive gesture 802 of FIG. 8 captured by the sensor 103, the first gesture 314, and the second gesture 318 in a block 1608.

The method 1600 can also include generating the transformation matrix 810 of FIG. 8 based on the calibration point 306 in the display coordinate system 332 of FIG. 3 and the intersection 336 of FIG. 3 in the sensor coordinate system 334 of FIG. 3 in a block 1610. The method can also include generating the first calibration vector 322 of FIG. 3 for representing the first gesture 314 directed at the calibration point 306 from the first position 316; generating the second calibration vector 330 of FIG. 3 for representing the second gesture 318 directed at the calibration point 306 from the second position 320; and determining the intersection 336 based on the first calibration vector 322 and the second calibration vector 330 in a block 1612.

The method 1600 can also include determine the first appendage position 806 of FIG. 8 of the directive gesture 802 in the sensor coordinate system 334 and determining the second appendage position 808 of FIG. 8 of the directive gesture 802 in the sensor coordinate system 334. The method 1600 can further include calculating the transformed first point 812 of FIG. 8 in the display coordinate system 332 by applying the transformation matrix 810 to the first appendage position 806; calculating the transformed second point 814 of FIG. 8 in the display coordinate system 332 by applying the transformation matrix 810 to the second appendage position 808; generating the ray casting vector 804 of FIG. 8 based on the transformed first point 812 and the transformed second point 814; and generating the position indicator 816 based on the intersection 336 of the ray casting vector 804 with the display plane 818 of FIG. 8 in the display coordinate system 332 in a block 1614.

The method 1600 can further include determining the reference point 904 of FIG. 9 of the directive gesture 802 in the sensor coordinate system 334. The method 1600 can also include calculating the transformed referencing point 906 of FIG. 9 of the directive gesture 802 in the display coordinate system 332 by applying the transformation matrix 810 to the reference point 904 and generating the orthographic projection 902 of FIG. 9 of the directive gesture 802 on the display interface 240 based on the transformed referencing point 906 in the display coordinate system 332 in a block 1616.

Figure 17:
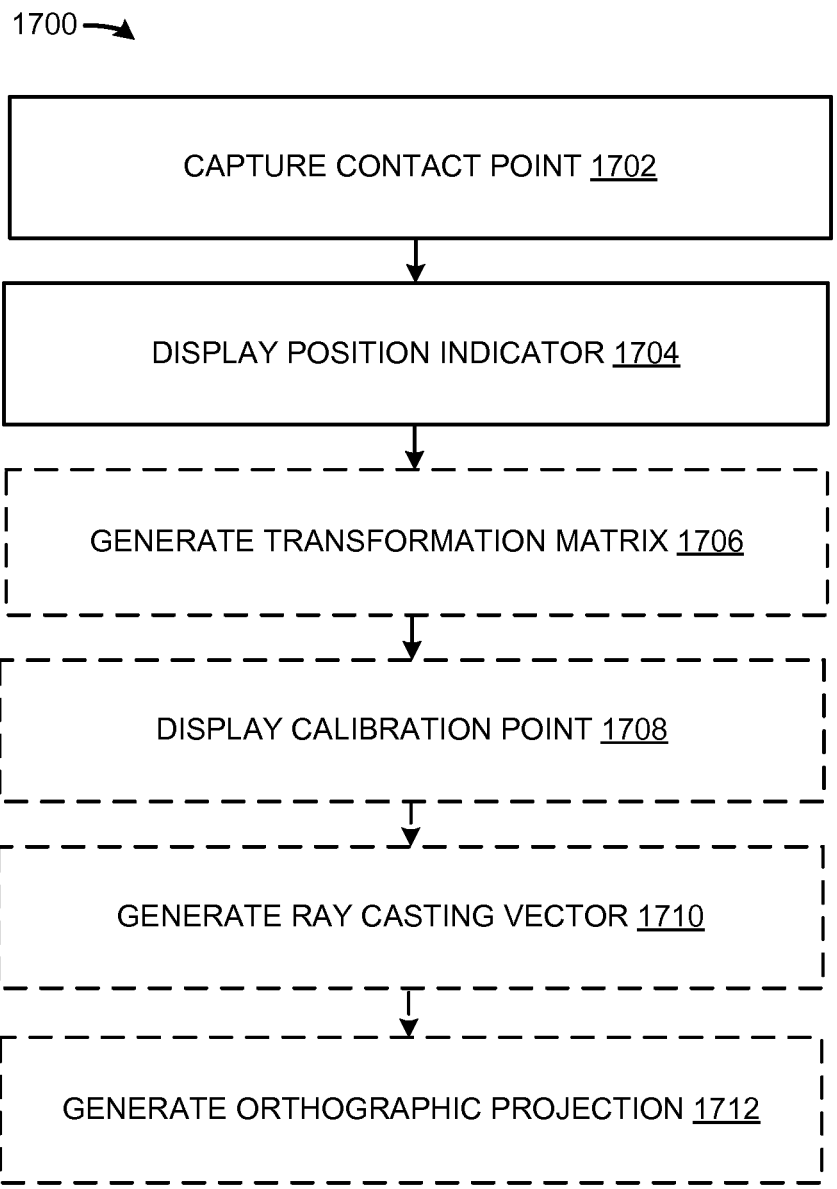
FIG. 17 is a flow chart of another method of operation of the electronic system in a further embodiment of the present invention.

Referring now to FIG. 17, therein is shown another exemplary flow chart of a method 1700 of operation of the electronic system 100 of FIG. 1 in a further embodiment. In one example embodiment, the electronic system 100 can implement the control flow 1200 of FIG. 12.

The method 1700 can include capturing, with the sensor 103 of FIG. 1, the contact point 402 of FIG. 4 between the calibration gesture 304 of FIG. 3 and the display interface 240 of FIG. 2 in a block 1702; and displaying, with the control unit 212 of FIG. 2 coupled to the sensor 103, the position indicator 816 of FIG. 8 on the display interface 240 based on the directive gesture 802 of FIG. 8 captured by the sensor 103 and the contact point 402 in a block 1704.

The method 1700 can include generating the transformation matrix 810 of FIG. 8 based on the calibration point 306 of FIG. 3 in the display coordinate system 332 of FIG. 3 and the contact point 402 in the sensor coordinate system 334 of FIG. 3 in a block 1706. The method 1700 can also include displaying the calibration point 306 for guiding the calibration gesture 304 prior to the sensor 103 capturing the contact point 402 in a block 1708.

The method 1700 can also include determining the first appendage position 806 of FIG. 8 of the directive gesture 802 in the sensor coordinate system 334; and determining the second appendage position 808 of FIG. 8 of the directive gesture 802 in the sensor coordinate system 334. The method 1700 can further include calculating the transformed first point 812 of FIG. 8 in the display coordinate system 332 by applying the transformation matrix 810 to the first appendage position 806; calculating the transformed second point 814 of FIG. 8 in the display coordinate system 332 by applying the transformation matrix 810 to the second appendage position 808; generating the ray casting vector 804 of FIG. 8 based on the transformed first point 812 and the transformed second point 814; and generating the position indicator 816 based on the intersection 336 of FIG. 8 of the ray casting vector 804 with the display plane 818 of FIG. 8 in the display coordinate system 332 in a block 1710.

The method 1700 can further include determining the reference point 904 of FIG. 9 of the directive gesture 802 in the sensor coordinate system 334. The method 1700 can also include calculating the transformed referencing point 906 of FIG. 9 of the directive gesture 802 in the display coordinate system 332 by applying the transformation matrix 810 to the reference point 904 and generating the orthographic projection 902 of FIG. 9 of the directive gesture 802 on the display interface 240 based on the transformed referencing point 906 in the display coordinate system 332 in a block 1712.

The modules described herein can be hardware implementation or hardware accelerators, including passive circuitry, active circuitry, or both, in the first control unit 212 of FIG. 2, the second control unit 234 of FIG. 2, or a combination thereof. The modules can also be hardware implementation or hardware accelerators, including passive circuitry, active circuitry, or both, within the first device 102, the second device 106, or a combination thereof but outside of the first control unit 212, the second control unit 234, or a combination thereof.

For illustrative purposes, the various modules have been described as being specific to the first device 102, the second device 106, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 214 of FIG. 2, the second storage unit 246 of FIG. 2, or a combination thereof can represent the non-transitory computer readable medium. The first storage unit 214, the second storage unit 246, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic device comprising:
    a curved display interface divided into multiple display regions grouped by curvature and configured to display a calibration point in each of the display regions to direct one or more calibration gestures to each of the display regions to tailor a calibration to different areas of the curved display interface;
    a sensor, coupled to the curved display interface, and configured to:
        capture a first gesture directed at the calibration point from a first position, wherein the first gesture is for calibrating the electronic device, and
        capture a second gesture directed at the calibration point from a second position, wherein the second position is different from the first position, and wherein the second gesture is for calibrating the electronic device; and
    a control unit, coupled to the curved display interface, and configured to:
        generate a first calibration vector for representing the first gesture directed at the calibration point from the first position,
        generate a second calibration vector for representing the second gesture directed at the calibration point from the second position,
        determine an intersection based on the first calibration vector and the second calibration vector by determining a midpoint of a perpendicular intersecting segment connecting the first calibration vector and the second calibration vector,
        display a position indicator on the curved display interface based on a directive gesture captured by the sensor, wherein the position indicator is based on the first gesture and the second gesture, and wherein the directive gesture is for manipulating a graphic or a user interface of the curved display interface, and
        recalibrate the electronic device upon detecting a change in an orientation or a location of the sensor.

2. The electronic device as claimed in claim 1, wherein the control unit is further configured to generate a transformation matrix based on the calibration point in a display coordinate system and an intersection in a sensor coordinate system.

3. The electronic device as claimed in claim 1, wherein the first gesture and the second gesture include a user touching the calibration point displayed on the curved display interface using an appendage of the user.

4. The electronic device as claimed in claim 1, wherein the control unit is further configured to:
    determine a first appendage position of the directive gesture in a sensor coordinate system;
    determine a second appendage position of the directive gesture in the sensor coordinate system;
    calculate a transformed first point in a display coordinate system by applying a transformation matrix to the first appendage position;
    calculate a transformed second point in the display coordinate system by applying the transformation matrix to the second appendage position;
    generate a ray casting vector based on the transformed first point and the transformed second point; and
    generate the position indicator based on an intersection of the ray casting vector with a display plane in the display coordinate system.

5. The electronic device as claimed in claim 1, wherein the control unit is configured to:
    determine a reference point of the directive gesture in a sensor coordinate system;
    calculate a transformed referencing point of the directive gesture in a display coordinate system by applying a transformation matrix to the reference point; and
    generate an orthographic projection of the directive gesture on the curved display interface based on the transformed referencing point in the display coordinate system.

6. The electronic device as claimed in claim 1, wherein the directive gesture is a typing gesture for generating the position indicator over a keyboard key.

7. A method of operation of an electronic device comprising:

displaying, with a curved display interface divided into multiple display regions grouped by curvature, a calibration point in each of the display regions to direct one or more calibration gestures to each of the display regions to tailor a calibration to different areas of the curved display interface;

capturing, with a sensor coupled to the curved display interface, a first gesture directed at the calibration point from a first position, wherein the first gesture is for calibrating the electronic device;

capturing a second gesture directed at the calibration point from a second position, wherein the second position is different from the first position, and wherein the second gesture is for calibrating the electronic device;

generating a first calibration vector for representing the first gesture directed at the calibration point from the first position;

generating a second calibration vector for representing the second gesture directed at the calibration point from the second position; and determining an intersection based on the first calibration vector and the second calibration vector by determining a midpoint of a perpendicular intersecting segment connecting the first calibration vector and the second calibration vector;

displaying, with a control unit coupled to the curved display interface, a position indicator on the curved display interface based on a directive gesture captured by the sensor, wherein the position indicator is based on the first gesture and the second gesture, and wherein the directive gesture is for manipulating a graphic or a user interface of the curved display interface; and recalibrating the electronic device upon detecting a change in an orientation or a location of the sensor.

8. The method as claimed in claim 7, further comprising generating a transformation matrix based on the calibration point in a display coordinate system and an intersection in a sensor coordinate system.

9. The method as claimed in claim 7, further comprising tailoring the calibration by capturing a user touching the calibration point displayed on the curved display interface using an appendage of the user.

10. The method as claimed in claim 7, further comprising:
determining a first appendage position of the directive gesture in a sensor coordinate system;
determining a second appendage position of the directive gesture in the sensor coordinate system;
calculating a transformed first point in a display coordinate system by applying a transformation matrix to the first appendage position;
calculating a transformed second point in the display coordinate system by applying the transformation matrix to the second appendage position;
generating a ray casting vector based on the transformed first point and the transformed second point; and
generating the position indicator based on an intersection of the ray casting vector with a display plane in the display coordinate system.

11. The method as claimed in claim 7, further comprising:
determining, a reference point of the directive gesture in a sensor coordinate system;
calculating a transformed referencing point of the directive gesture in a display coordinate system by applying a transformation matrix to the reference point; and generating an orthographic projection of the directive gesture on the curved display interface based on the transformed referencing point in the display coordinate system.

12. The method as claimed in claim 7, wherein the directive gesture is a typing gesture for generating the position indicator over a keyboard key.

13. A non-transitory computer readable medium including instructions that, when executed by at least one processor of an electronic device, are configured to cause the at least one processor to:

display, with a curved display interface divided into multiple display regions grouped by curvature, a calibration point in each of the display regions to direct one or more calibration gestures to each of the display regions to tailor a calibration to different areas of the curved display interface;

capture, with a sensor coupled to the curved display interface, a first gesture directed at the calibration point from a first position, wherein the first gesture is for calibrating the electronic device;

capture a second gesture directed at the calibration point from a second position, wherein the second position is different from the first position, and wherein the second gesture is for calibrating the electronic device;

generate a first calibration vector for representing the first gesture directed at the calibration point from the first position;

generate a second calibration vector for representing the second gesture directed at the calibration point from the second position; and determine an intersection based on the first calibration vector and the second calibration vector by determining a midpoint of a perpendicular intersecting segment connecting the first calibration vector and the second calibration vector;

display a position indicator on the curved display interface based on a directive gesture captured by a sensor, wherein the position indicator is based on the first gesture and the second gesture, and wherein the directive gesture is for manipulating a graphic or a user interface of the curved display interface; and recalibrate the electronic device upon detecting a change in an orientation or a location of the sensor.

14. The non-transitory computer readable medium as claimed in claim 13, the instructions further comprising generating a transformation matrix based on the calibration point in a display coordinate system and an intersection in a sensor coordinate system.

15. The non-transitory computer readable medium as claimed in claim 13, the instructions further comprising tailoring the calibration by capturing a user touching the calibration point displayed on the curved display interface using an appendage of the user.

16. The non-transitory computer readable medium as claimed in claim 13, the instructions comprising:
determining a first appendage position of the directive gesture in a sensor coordinate system;
determining a second appendage position of the directive gesture in the sensor coordinate system;
calculating a transformed first point in a display coordinate system by applying a transformation matrix to the first appendage position;
calculating a transformed second point in the display coordinate system by applying the transformation matrix to the second appendage position;

generating a ray casting vector based on the transformed first point and the transformed second point; and generating the position indicator based on an intersection of the ray casting vector with a display plane in the display coordinate system.

17. The non-transitory computer readable medium as claimed in claim 13, the instructions further comprising:

determining a reference point of the directive gesture in a sensor coordinate system;

calculating a transformed referencing point of the directive gesture in a display coordinate system by applying a transformation matrix to the reference point; and generating an orthographic projection of the directive gesture on the curved display interface based on the transformed referencing point in the display coordinate system.

18. The non-transitory computer readable medium as claimed in claim 13, wherein the directive gesture is a typing gesture for generating the position indicator over a keyboard key.

* * * * *